US012682232B1

(12) United States Patent
Meyer et al.

(10) Patent No.: US 12,682,232 B1
(45) Date of Patent: Jul. 14, 2026

(54) BATCH STATISTICS ACCELERATION

(71) Applicant: Amazon Technologies, Inc., Seattle, WA (US)

(72) Inventors: Paul Gilbert Meyer, Jericho, VT (US); Sundeep Amirineni, Cedar Park, TX (US); Ron Diamant, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 832 days.

(21) Appl. No.: 17/935,419

(22) Filed: Sep. 26, 2022

(51) Int. Cl.
G06N 3/08 (2023.01)
G06F 18/10 (2023.01)

(52) U.S. Cl.
CPC .............. G06N 3/08 (2013.01); G06F 18/10 (2023.01)

(58) Field of Classification Search
CPC .................................. G06N 3/08; G06F 18/10
See application file for complete search history.

(56) References Cited

U.S. PATENT DOCUMENTS

| | | |
|---|---|---|
| 4,914,614 A | 4/1990 | Yamakawa |
| 4,959,811 A | 9/1990 | Szczepanek |
| 5,072,418 A | 12/1991 | Boutaud et al. |
| 5,117,498 A | 5/1992 | Miller et al. |
| 5,459,681 A | 10/1995 | Harrison et al. |
| 5,524,251 A | 6/1996 | Urasaki |
| 6,052,773 A | 4/2000 | DeHon et al. |
| 6,079,623 A | 6/2000 | Ahn et al. |

| | | |
|---|---|---|
| 6,105,105 A | 8/2000 | Trimberger |
| 6,654,730 B1 | 11/2003 | Kato et al. |
| 6,757,284 B1 | 6/2004 | Galles |
| 7,755,631 B1 | 7/2010 | Mrazek et al. |
| 8,121,235 B1 | 2/2012 | Sun et al. |
| 9,081,634 B1 | 7/2015 | Simkins et al. |
| 9,495,154 B2 | 11/2016 | Khan |
| 9,710,265 B1 | 7/2017 | Temam et al. |

(Continued)

FOREIGN PATENT DOCUMENTS

GB          2311882 A          10/1997

OTHER PUBLICATIONS

Guo, R. et al., "How to Implement an Efficient LayerNorm CUDA Kernel—OneFlow Performance Optimization", Dec. 2021, Medium, pp. 1-29 (Year: 2021).*

(Continued)

*Primary Examiner* — Matthew Ell
*Assistant Examiner* — Louis Christopher Nye
(74) *Attorney, Agent, or Firm* — Weaver Austin Villeneuve & Sampson LLP

(57) ABSTRACT

A technique to compute statistics of data elements include serially inputting the data elements into a compute channel. The compute channel can generate a first running mean and a first running variance associated with data elements of the vector having odd sequence indices, and a second running mean and a second running variance associated with data elements of the vector having even sequence indices. Subsequent to serially inputting data elements into the compute channel, the first running mean and the second running mean are aggregated to generate a mean associated with the data elements of the vector, and the first running variance and the second running variance are aggregated to generate a variance associated with the data elements of the vector.

20 Claims, 13 Drawing Sheets

100

(56) References Cited

U.S. PATENT DOCUMENTS

| | | | |
|---|---|---|---|
| 10,120,580 | B2 | 11/2018 | Olcay |
| 10,157,333 | B1 | 12/2018 | Wang et al. |
| 10,210,860 | B1 | 2/2019 | Ward et al. |
| 10,592,250 | B1 | 3/2020 | Diamant et al. |
| 10,831,507 | B2 | 11/2020 | Shah et al. |
| 10,942,742 | B1 | 3/2021 | Diamant et al. |
| 11,003,429 | B1 | 5/2021 | Zejda et al. |
| 11,036,827 | B1 | 6/2021 | Zejda et al. |
| 11,182,337 | B1 | 11/2021 | Maiyuran et al. |
| 11,561,791 | B2* | 1/2023 | Das Sarma ............ G06F 17/16 |
| 12,072,836 | B2 | 8/2024 | Shah et al. |
| 12,340,300 | B1 | 6/2025 | Abts et al. |
| 2004/0230784 | A1 | 11/2004 | Cohen |
| 2005/0144215 | A1 | 6/2005 | Simkins et al. |
| 2005/0273481 | A1 | 12/2005 | Dent |
| 2006/0095739 | A1 | 5/2006 | Selvaggi et al. |
| 2006/0212499 | A1 | 9/2006 | New et al. |
| 2006/0230092 | A1 | 10/2006 | Ching et al. |
| 2006/0253689 | A1 | 11/2006 | Knowles |
| 2006/0288070 | A1 | 12/2006 | Vadi et al. |
| 2007/0073922 | A1 | 3/2007 | Go et al. |
| 2007/0240142 | A1 | 10/2007 | Brokenshire et al. |
| 2009/0119460 | A1 | 5/2009 | Lin et al. |
| 2009/0293048 | A1 | 11/2009 | Chen et al. |
| 2012/0017066 | A1 | 1/2012 | Vorbach et al. |
| 2013/0258376 | A1 | 10/2013 | Tsuchiya |
| 2014/0317333 | A1 | 10/2014 | Dorst et al. |
| 2015/0277924 | A1 | 10/2015 | Zappulla et al. |
| 2018/0113006 | A1 | 4/2018 | Tyrer |
| 2018/0253877 | A1 | 9/2018 | Kozub et al. |
| 2018/0336164 | A1 | 11/2018 | Phelps et al. |
| 2019/0034785 | A1 | 1/2019 | Murray et al. |
| 2019/0042248 | A1 | 2/2019 | Bradford et al. |
| 2019/0205737 | A1 | 7/2019 | Bleiweiss et al. |
| 2019/0266217 | A1 | 8/2019 | Arakawa et al. |
| 2019/0377580 | A1 | 12/2019 | Vorbach et al. |
| 2020/0057748 | A1 | 2/2020 | Danilak |
| 2020/0211189 | A1 | 7/2020 | Yip et al. |
| 2020/0272882 | A1* | 8/2020 | Lo ............................ G06N 3/08 |
| 2020/0311531 | A1 | 10/2020 | Liu et al. |
| 2020/0342632 | A1 | 10/2020 | Frumkin et al. |
| 2020/0356837 | A1 | 11/2020 | Hargil et al. |
| 2020/0409664 | A1 | 12/2020 | Li et al. |
| 2021/0073171 | A1 | 3/2021 | Master et al. |
| 2021/0109796 | A1* | 4/2021 | Fozard ...................... G06F 9/50 |
| 2021/0383199 | A1 | 12/2021 | Weissenborn et al. |
| 2022/0229879 | A1 | 7/2022 | Thouppuarachchi et al. |
| 2022/0283984 | A1 | 9/2022 | Kim et al. |
| 2022/0284283 | A1* | 9/2022 | Yin .......................... G06N 3/08 |
| 2022/0343137 | A1 | 10/2022 | Surendran et al. |
| 2022/0405556 | A1* | 12/2022 | Lichtenau ................ G06N 3/08 |
| 2022/0414182 | A1 | 12/2022 | Adelman et al. |
| 2023/0019151 | A1 | 1/2023 | Ahmadi et al. |
| 2024/0193117 | A1 | 6/2024 | Kapre et al. |
| 2024/0264975 | A1 | 8/2024 | Li et al. |
| 2024/0303218 | A1 | 9/2024 | Zhao et al. |

OTHER PUBLICATIONS

Welford, B. P., "Note on a Method for Calculating Corrected Sums of Squares and Products", Aug. 1962, CMU Statistics, Technometrics, pp. 1-2 (Year: 1962).*

Kucukkabak, U. et al., "Design and Implementation of Reciprocal Unit Using Table Look-up and Newton-Raphson Iteration", 2004, Proceedings of the EUROMICRO Systems on Digital System Design DSD'04, pp. 1-5 (Year: 2004).*

Rakesh, "Average every 2 values in a list using a loop", Jul. 2018, Stack Overflow, pp. 1-2 (Year: 2018).*

Cook, J., "Accurately Computing Running Variance", John D. Cook Consulting [blog], Nov. 1, 2014, pp. 1-3, URL: https://www.johndcook.com/blog/standard_deviation/ [retrieved on Feb. 8, 2023].

Ioffe, S. et al., "Batch Normalization: Accelerating Deep Network Training by Reducing Internal Covariate Shift", 32nd International Conference on Machine Learning (ICML 15), Mar. 2, 2015, pp. 1-11, URL: https://arxiv.org/abs/1502.03167v3.

U.S. Non-Final Office Action dated Sep. 27, 2022 in U.S. Appl. No. 17/447,677.

U.S. Appl. No. 17/447,675, inventor Meyer, filed Sep. 14, 2021.

U.S. Appl. No. 17/447,677, inventor Meyer, filed Sep. 14, 2021.

U.S. Appl. No. 17/934,145, inventors Tan et al., filed Sep. 21, 2022.

U.S. Appl. No. 17/934,147, inventors Tan et al., filed Sep. 21, 2022.

U.S. Appl. No. 17/935,415, inventors Meyer et al., filed Sep. 26, 2022.

U.S. Appl. No. 17/937,329, inventors Meyer et al., filed Sep. 30, 2022.

U.S. Appl. No. 17/937,333, inventors Meyer et al., filed Sep. 30, 2022.

U.S. Appl. No. 17/937,335, inventors Meyer et al., filed Sep. 30, 2022.

Wikipedia [webpage], "Algorithms for calculating variance", Mar. 24, 2001, pp. 1-14, URL: https://en.wikipedia.org/wiki/Algorithms_for_calculating_variance [retrieved on Feb. 8, 2023].

U.S. Non-Final Office Action dated Oct. 4, 2023, in U.S. Appl. No. 17/934,147.

U.S. Restriction Requirement dated Sep. 28, 2023, in U.S. Appl. No. 17/937,333.

Stack Overflow, "Search max value and index inside Nested list", 2013, 3 pages, URL: https://stackoverflow.com/questions/18616793/search-max-value-and-index-inside-nested-list [retrieved on Feb. 27, 2023].

Stack Overflow, "How do I get indices of N maximum values in a NumPy array?", 2011, 16 pages, URL: https://stackoverflow.com/questions/6910641/how-do-i-get-indices-of-n-maximum-values-in-a-numpy-array [retrieved on Feb. 28, 2023].

U.S. Final Office Action dated Mar. 9, 2023 in U.S. Appl. No. 17/447,677.

U.S. Non-Final Office Action dated Jul. 17, 2023, in U.S. Appl. No. 17/447,677.

Jacob, J. A., et al., "Memory Interfacing and Instruction Specification for Reconfigurable Processors," FPGA '99: Proc. of the 1999 ACM/SIGDA Seventh International Symposium on Field Programmable Gate Arrays, Feb. 1999, pp. 145-154.

University of Illinois Urbana-Champaign, "Pipeline Motivation: Single-cycle datapath," Sep. 2011, pp. 1-31, URL: https://courses.grainger.illinois.edu/cs232/fa2011/lectures/L11.pdf.

U.S. Appl. No. 19/017,173, inventors Meyer P.G. et al., filed Jan. 10, 2025.

Ba, J. L et al., "Layer Normalization," arXiv: 1607.06450v1 [stat. ML], Jul. 21, 2016, pp. 1-14.

Wu, Y et al., "Group Normalization," arXiv: 1803.08494v3 [cs. CV], Jun. 11, 2018, pp. 1-10.

* cited by examiner

600

700

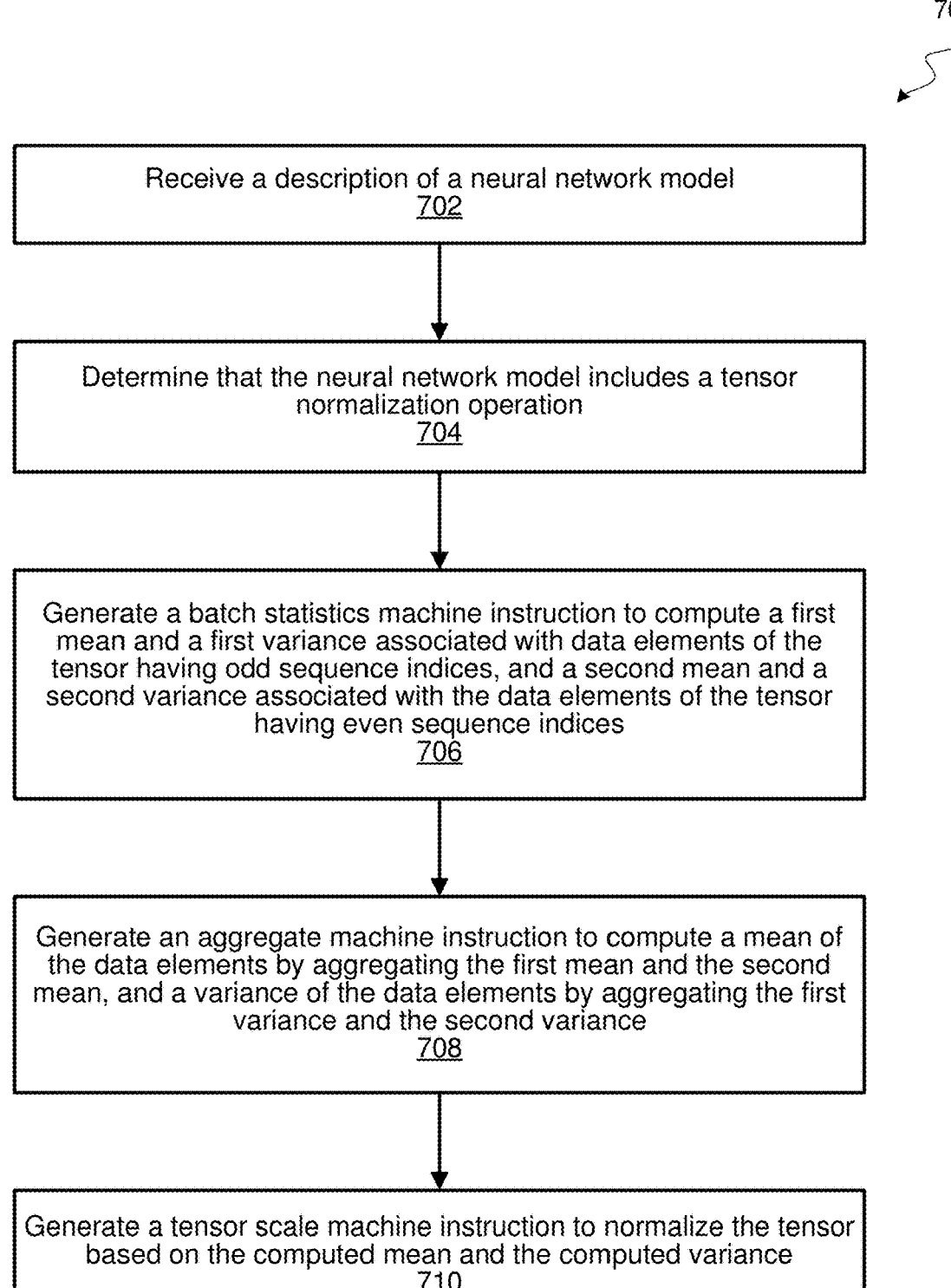

Receive a description of a neural network model
702

Determine that the neural network model includes a tensor
normalization operation
704

Generate a batch statistics machine instruction to compute a first
mean and a first variance associated with data elements of the
tensor having odd sequence indices, and a second mean and a
second variance associated with the data elements of the tensor
having even sequence indices
706

Generate an aggregate machine instruction to compute a mean of
the data elements by aggregating the first mean and the second
mean, and a variance of the data elements by aggregating the first
variance and the second variance
708

Generate a tensor scale machine instruction to normalize the tensor
based on the computed mean and the computed variance
710

FIG. 7

800
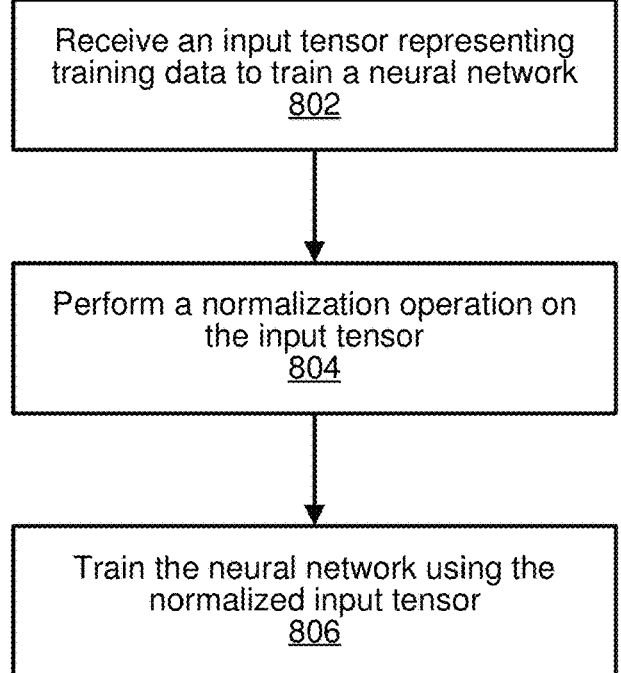
Receive an input tensor representing training data to train a neural network
802
Perform a normalization operation on the input tensor
804
Train the neural network using the normalized input tensor
806
FIG. 8

900

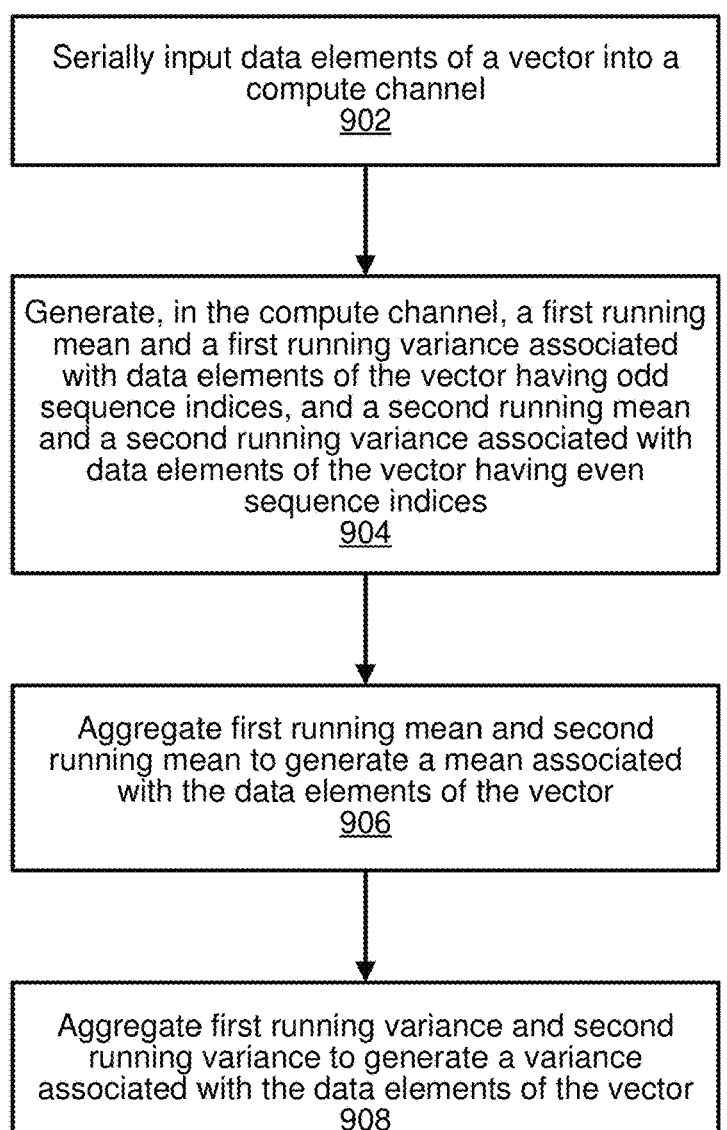

Serially input data elements of a vector into a compute channel
902

Generate, in the compute channel, a first running mean and a first running variance associated with data elements of the vector having odd sequence indices, and a second running mean and a second running variance associated with data elements of the vector having even sequence indices
904

Aggregate first running mean and second running mean to generate a mean associated with the data elements of the vector
906

Aggregate first running variance and second running variance to generate a variance associated with the data elements of the vector
908

FIG. 9

BATCH STATISTICS ACCELERATION

BACKGROUND

Neural networks utilize computational models to perform complex tasks. A neural network can perform computations using a set of weights. Through these computations, the weights are combined with input data (which can also be referred to as feature maps) through multiple layers to perform an inference operation. For example, a neural network model can be used in natural language processing to translate and understanding human language, or in computer vision systems to analyze and react to images and video frames. The weights used in a specific neural network can be determined via a training process in which the weight values are tuned to yield better predictions.

BRIEF DESCRIPTION OF THE DRAWINGS

Various embodiments in accordance with the present disclosure will be described with reference to the drawings, in which:

FIG. 7 illustrates a flow diagram of an example of a process to generate machine instructions;

FIG. 8 illustrates a block diagram of an example of a process to train a neural network;

FIG. 9 illustrates a flow diagram of an example of a process to compute mean and variance information;

DETAILED DESCRIPTION

Figure 1:
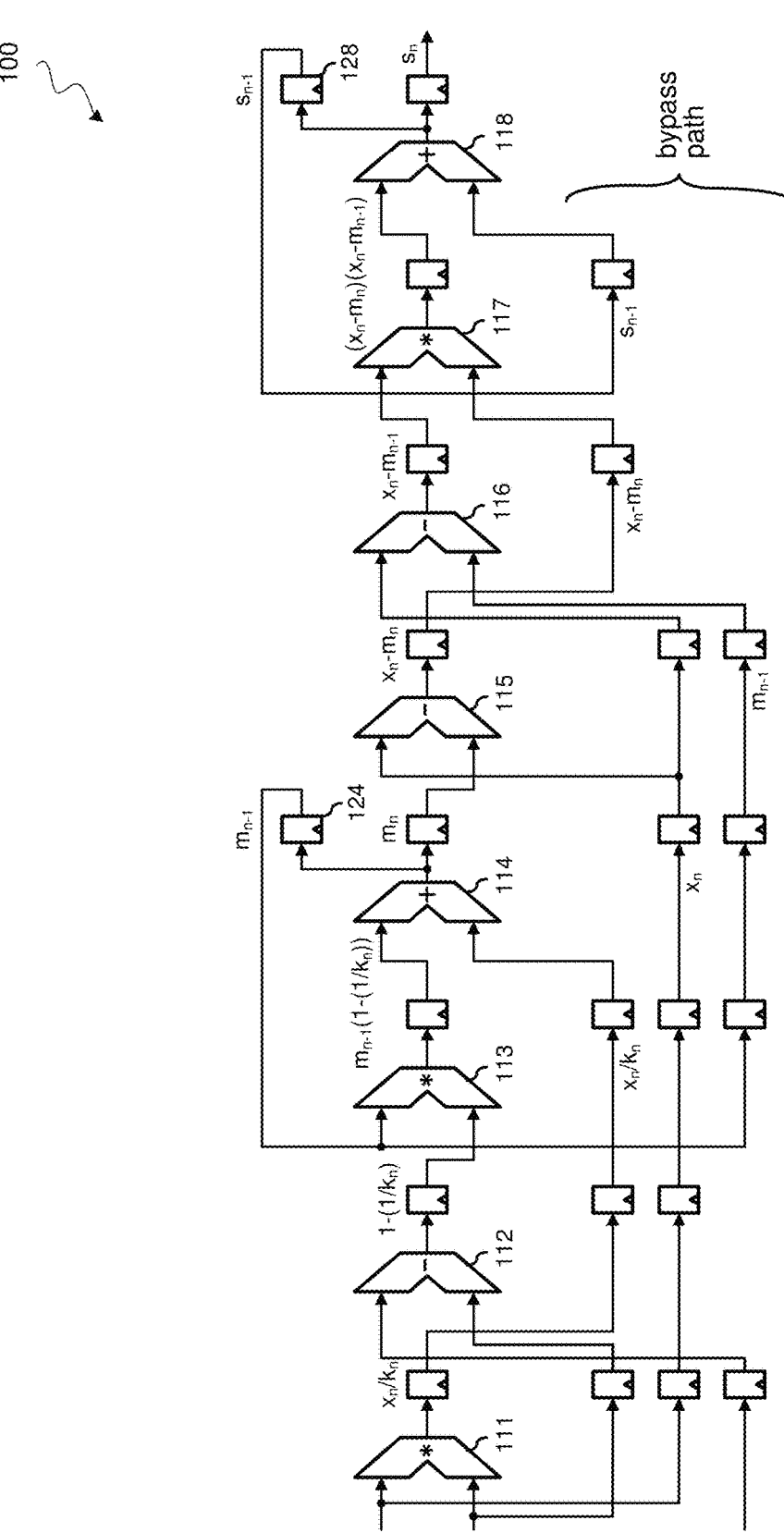
FIG. 1 illustrates a block diagram of an example of a compute channel.

Batch normalization is a popular technique to train neural networks. Changes in the distribution of input data to a neural network can amplify in deeper layers of the network. This may cause the neural network to continuously adapt to the changing input distribution at each training epoch. As a result, convergence is prolonged, and the learning capabilities of the network can be hindered. Batch normalization normalizes the inputs to a layer of the neural network. Batch normalization operates on the input data of a training epoch (may be referred to as a mini-batch). Each data element is shifted by the mean (average) of the min-batch, and scaled by the standard deviation. The result is further scaled and shifted by learned parameters. Hence, as part of the batch normalization operation, the mean and variance of an input data set is determined. The mean of a set of data elements can be computed by summing each data element and dividing by the number of data elements. However, computing the variance may take four to eight clock cycles per data element depending on the algorithm. For a data set with a large number of data elements, computing the variance can quickly become a bottleneck.

The techniques disclosed herein provide a computational pipeline that can efficiently compute the mean and variance for a set of data elements. After an initial latency of the first data element flowing through the computational pipeline, a throughput of one clock cycle per data element can be achieved for computing the mean and variance of the set of data elements. The single cycle per data element throughput can be achieved by maintaining a running mean and a running variance for the even sequenced data elements, and maintaining a running mean and a running variance for the odd sequenced data elements. Both the mean and variance values can be computed concurrently in the computational pipeline. Hence, the mean and variance values can be computed over a single pass of the data elements through the pipeline. Accelerating the mean and variance computations can substantially reduce the training time when batch normalization is employed. Accelerating the mean and variance computations can also speed up other operations that utilize mean and variance values.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

The mean and variance of a stream of data elements can be computed using Welford's algorithm. Under Welford's algorithm, the mean and variance of a stream of data elements can be computed as follows:

$$m_n = m_{n-1}\left(1 - \frac{1}{k}\right) + x_n * \left(\frac{1}{k}\right)$$

$$s_n = s_{n-1} + (x_n - m_n)(x_n - m_{n-1})$$

where $x_n$ is the $n^{th}$ data element (n starting at 0), k is the index count of the data elements n+1 (count starting at 1), $m_n$ is the mean after the $n^{th}$ data element, $m_{n-1}$ is the previous mean, $s_n$ is the variance after the $n^{th}$ data element, and $s_{n-1}$ is the previous variance. It should be noted that $s_n$ indicated above is actually the statistical variance multiplied by the number of data elements, and $s_n$ can be divided by the number of data elements before being used in subsequent operations. For ease of explanation, $s_n$ will simply be referred to hereafter as the variance.

FIG. 1 illustrates a block diagram of an example of a compute channel 100 for computing the mean and variance of a set of data elements being streamed into the channel. Compute channel 100 may include eight compute stages 111 to 118 coupled in series to form a pipeline. Each compute stage may implement an arithmetic computation from Welford's algorithm. In the example shown, each arithmetic computation implemented in a compute stage spans one clock cycle. Hence, a data element can take eight clock cycles to traverse down the pipeline. Each compute stage may also include a bypass path having one or more parallel bypass registers to allow one or more values to bypass the compute stage and be fed forward to a subsequent compute stage. After an initial latency of the first data element flowing down the pipeline, a throughput of processing one data element per clock cycle can be achieved to compute the mean and variance for a set of data elements being streamed or serially inputted into compute channel 100.

The first compute stage 111 of compute channel 100 may take as inputs a data element x and the reciprocal of the sequence index $1/k$ for the data element x, with k being the sequence index of the data element x (which represents the data element count). A floating-point value of 1.0 is also inputted into the first compute stage 111 along a bypass path. The first compute stage may implement a multiplier to perform multiplication of the data element x with the reciprocal of the sequence index $1/k$ to generate the computational output $x/k$. The floating-point value 1.0 is bypassed and provided to the second compute stage 112. Data element x and the reciprocal of the sequence index $1/k$ are also provided along the bypass path to provide these values down the pipeline.

The second compute stage 112 may implement a subtractor to perform a subtraction of the reciprocal of the sequence index $1/k$ from a floating-point value of 1.0 received from the bypass path of the first compute stage 111. The computational output of the second compute stage 112 is $(1-(1/k))$. Meanwhile, the computational output $x/k$ of the first compute stage 111 and the data element x are provided along the bypass path of the second compute stage 112 down the pipeline.

The third compute stage 115 may receive a mean $m_{n-1}$ computed for the previous data element (may be referred to as the previous mean) being fed back from the next compute stage 114, and the computational output $(1-(1/k))$ of the second compute stage 112. The third compute stage 115 may implement a multiplier to perform a multiplication of the previous mean $m_{n-1}$ with the computational output $(1-(1/k))$ of the second compute stage 112. The computational output of the third compute stage 115 is $m_{n-1}(1-(1/k))$. Meanwhile, the computational output $x/k$ of the first compute stage 111, the data element x, and the previous mean $m_{n-1}$ are provided along the bypass path of the third compute stage 115 down the pipeline.

The fourth compute stage 114 may receive the computational output $m_{n-1}(1-(1/k))$ of the third compute stage 115 and the computational output $x/k$ of the first compute stage 111 along the bypass path. The fourth compute stage 114 may implement an adder to perform an addition of the computational output $m_{n-1}(1-(1/k))$ of the third compute stage 115 with the computational output $x/k$ of the first compute stage 111 to generate the mean value m for the data element x. The computational output of the fourth compute stage 114 (the current mean value) is also fed back to the previous compute stage 115, which becomes the previous mean $m_{n-1}$ in the next clock cycle. Meanwhile, the data element x, and the previous mean $m_{n-1}$ are provided along the bypass path of the fourth compute stage 114 down the pipeline.

The fifth compute stage 115 may receive the computational output m of the fourth compute stage 114 (which is the current mean), and the data element x along the bypass path. The fifth compute stage 115 may implement a subtractor to perform a subtraction of the mean m from the data element x. The computational output of the fifth compute stage 115 is $(x-m)$. Meanwhile, the data element x, and the previous mean $m_{n-1}$ are provided along the bypass path of the fifth compute stage 115 down the pipeline.

The sixth compute stage 116 may receive both the data element x and previous mean $m_{n-1}$ along the bypass path.

The sixth compute stage 116 may implement a subtractor to perform a subtraction of the previous mean $m_{n-1}$ from the data element x. The computational output of the sixth compute stage 116 is $(x-m_{n-1})$. Meanwhile, the computational output of the fifth compute stage 115 $(x-m)$ is provided along the bypass path of the sixth compute stage 116 down the pipeline.

The seventh compute stage 117 may receive the computational output of the sixth compute stage 116 is $(x-m_{n-1})$, and the computational output of the fifth compute stage 115 $(x-m)$ along the bypass path. The seventh compute stage 117 may implement a multiplier to perform a multiplication of the computational output of the sixth compute stage 116 is $(x-m_{n-1})$ with the computational output of the fifth compute stage 115 $(x-m)$. The computational output of the seventh compute stage 117 is $(x-m)(x-m_{n-1})$. The seventh compute stage 117 may also receive a variance $s_{n-1}$ computed for the previous data element (may be referred to as the previous variance) being fed back from the next compute stage 118. This previous variance $s_{n-1}$ is provided along the bypass path of the seventh compute stage 117 down the pipeline The eighth compute stage 118 may receive the computational output of the seventh compute stage 117 $(x-m)(x-m_{n-1})$, and the previous variance $s_{n-1}$ along the bypass path. The eight compute stage 118 may implement an adder to perform an addition of the computational output of the seventh compute stage 117 $(x-m)(x-m_{n-1})$ and the previous variance $s_{n-1}$ to generate the variance s for the data element x. The computational output of the eighth compute stage 118 (the current variance value) is also fed back to the previous compute stage 117, which becomes the previous variance $s_{n-1}$ in the next clock cycle.

To compute the mean and variance for a set of data elements, the set of data elements can be serially inputted into compute channel 100 sequentially at a throughput of one data element per clock cycle. The fourth compute stage 114 tracks and updates the running mean, and the eighth compute stage 118 tracks and updates the running variance. Upon completion of serially inputting the data elements into compute channel 100, the variance can be outputted from the eighth compute stage 118. The mean can be shifted out from the fourth compute stage 114, for example, by providing the mean value computed for the last data element along the bypass path.

As noted above, both the data elements and the reciprocals of the sequence indices $(1/k)$ corresponding to the data elements are inputted into compute channel 100. Each data element is inputted into the compute channel 100 in parallel with the reciprocal of the sequence index $(1/k)$ corresponding to that data element. Although a compute stage can be added to the pipeline to calculate the reciprocal on the fly, a division operation can incur a latency of 8-10 clock cycles in some implementations. As such, to achieve the throughput of one data element per clock cycle, a sequence of precomputed reciprocal values (e.g., 1, 1/2, 1/5, . . . 1/n) can be preloaded in a parameter table, and the values can be sequentially read from the table and inputted into the compute channel 100 together with the corresponding data elements. Hence, compute channel 100 can avoid the division operation when computing the mean and variance, and avoid the latency incurred by the division operation. It should be noted that when multiple compute channels are operating in parallel, the reciprocal value can be shared amongst the compute channels. Hence, each reciprocal value can be read once from the table and be provided to multiple compute channels. The reciprocal value can also be computed once, and be provided to multiple compute channels.

Referring back to Welford's algorithm for computing the mean value, two operations are applied to the previous mean $m_{n-1}$. These two operations include multiplying the previous mean $m_{n-1}$ with $$\left(1 - \frac{1}{k}\right),$$

and adding that result to $$\left(x_n * \left(\frac{1}{k}\right)\right).$$

Hence, the feedback loop to compute the running mean requires two operations and hence two clock cycles to complete. Although it may be possible to integrate multiple operations into one clock cycle, doing so may limit the maximum clock frequency at which compute channel 100 can run. Hence, each compute stage is designed to perform a single operation to maximize the clock frequency. Accordingly, continuously streaming a set of data elements into the pipeline sequentially at one data element per clock cycle will result in the fourth compute stage toggling between a first running mean generated for the even sequenced data elements, and a second running mean generated for the odd sequenced data elements due to the two-cycle feedback loop.

Maintaining and toggling between two running computational results such as the even and odd mean values is generally not an issue when data elements are continuously inputted into the pipeline one data element after another at every clock cycle. At completion of streaming the set of data elements into the pipeline, the two mean values can be sequentially shifted out from the pipeline, and be aggregated together to obtain the mean for the full set of data elements. However, a pause or a bubble in the data stream can cause the two running values to go out of sync, and one of the running values can be dropped by the pipeline if it is not retained properly in the pipeline during the data bubble.

Figure 2:
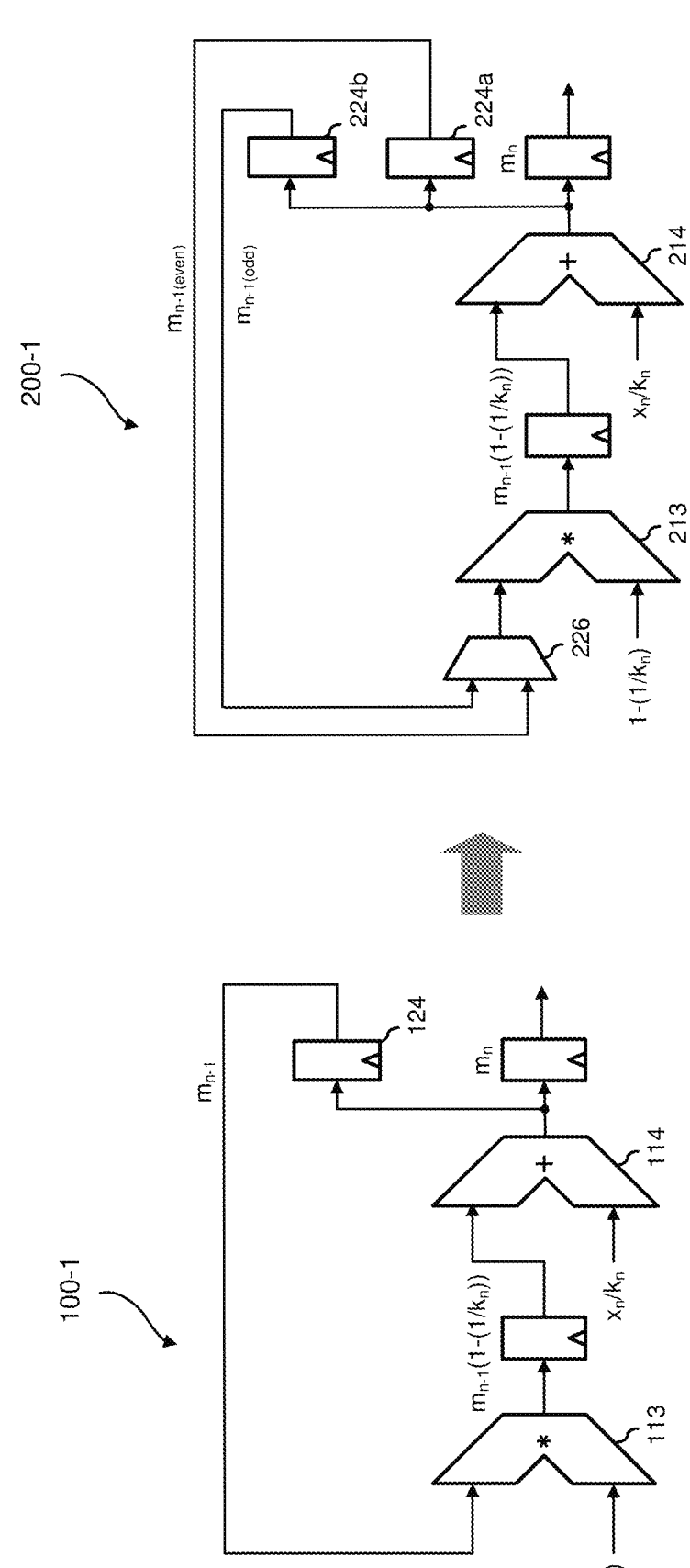
FIG. 2 illustrates a block diagram of an example of modifications to a portion of a compute channel.

FIG. 2 illustrates an example of a portion 200-1 of a modified compute channel that can be used to separately retain two running computational results. For ease of comparison, FIG. 2 also shows a portion 100-1 of compute channel 100 from FIG. 1. Portion 100-1 incudes the third compute stage 115 and the fourth compute stage 114. As discussed above, the fourth compute stage 114 tracks and maintains a running mean for the set of data elements being streamed into compute channel 100. Because of the two-cycle feedback loop to calculate the running mean, feedback register 124 will toggle between a mean value computed for the even sequenced data elements and a mean value computed for the odd sequenced data elements.

To ensure the two mean values can be properly retained if there is a pause or data bubble in the data stream, portion 100-1 of compute channel 100 can be modified as portion 200-1 to include two feedback registers 224a and 224b to receive the computational output of the fourth compute stage 214. The two feedback registers 224a and 224b have independent enable signals. When data elements are being streamed into the pipeline, two feedback registers 224a and 224b can be alternately enabled. In other words, feedback register 224a is enabled during one clock cycle with feedback register 224b disabled, then feedback register 224b is enabled during next clock cycle with feedback register 224a disabled, then feedback register 224a is enabled during the following clock cycle with feedback register 224b disabled, etc. Hence, feedback register 224a can be used, for example, to track and maintain a running mean value for even sequenced data elements, and feedback register 224b can be used, for example, to track and maintain a running mean value for odd sequenced data elements. A multiplexor 226 is also provided at the input to the third compute stage 215 to alternately select between the outputs of feedback registers 224a and 224b to provide the appropriate running previous mean value to the third compute stage 215.

When a data bubble or a pause in the data stream is encountered, the enable signals of feedback registers 224a and 224b can be disabled such that the running even mean value and the running odd mean value can be retained in the feedback registers. When the data stream is restarted, the alternate toggling of the enables to feedback registers 224a and 224b can be resumed. In this manner, the two running means can be properly retained, and computation of the running means can be resumed properly. It should also be noted that to compute the even and odd mean values properly, the sequence of (1/k) reciprocal values inputted into the compute channel 100 are tracked separately for the even and odd sequenced data elements. Hence, each (1/k) value is inputted twice over two consecutive clock cycles to provide a reciprocal value for the even sequenced data elements and the same reciprocal value for the odd sequence data elements.

Referring back to FIG. 1, given that the mean is used in the variance computation, streaming a set of data elements into the pipeline one data element after another at every clock cycle will also result in the eighth compute stage 118 toggling between a first running variance for the even sequenced data elements and a second running variance for the odd sequenced data elements. As such, a similar modification can be made to the eighth compute stage 118 to include two feedback registers to separate store the two running variance values, and to include a multiplexor prior to the input to the seventh compute stage 117 to properly select between the outputs of the two feedback registers. At completion of streaming the set of data elements into the compute channel, the even variance and the odd variance can be shifted out from the pipeline. To obtain the even mean and odd mean from the fourth compute stage, one or more additional data readout operations can be executed to feed forward the mean values to output the mean values from the compute channel 100.

It should be noted that the specific implementation of the computational operation for each compute stage is just one example of how a computational pipeline can be configured to perform mean and variance computations. Given that some of the operands in the computations are commutative, the order of the specific operations implemented by the compute stages can be rearranged. Furthermore, although the pipeline is shown to have eight compute stages, other implementations may utilize fewer or greater number of compute stages. For example, a seven-stage pipeline can be implemented by precomputing the (1−(1/k)) values and storing them in the parameter table similar to (1/k). The values can be read and inputted into the computational pipeline to eliminate the subtraction operation similar to the (1/k) values.

Figure 3:
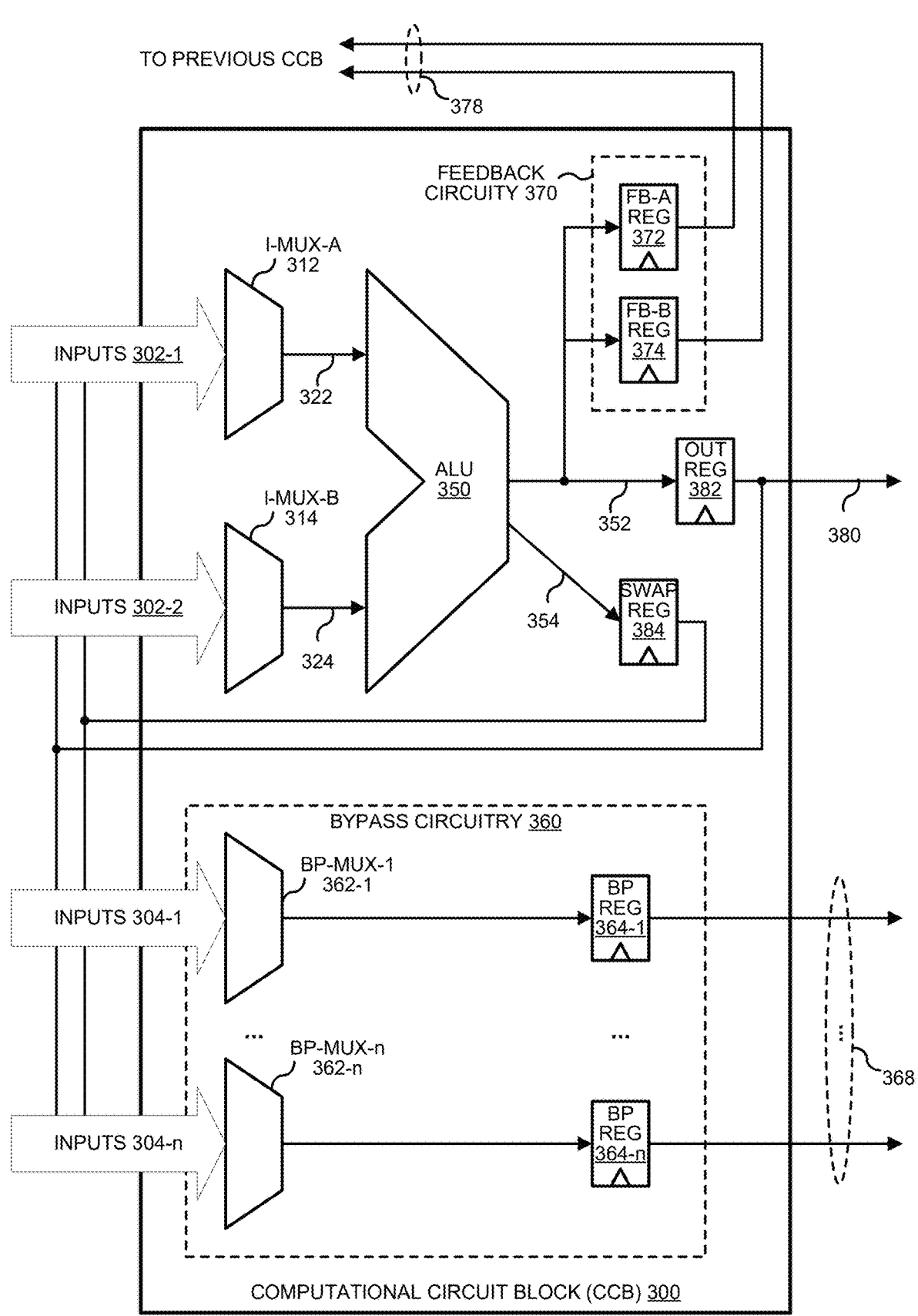
FIG. 3 illustrates a block diagram of an example of a computational circuit block.

Although a high throughput computational pipeline circuit for computing the mean and variance for a set of data elements have been described above, it can be advantageous to generalize the computational pipeline such that the pipeline can be flexible programmed to perform other types of computations. FIG. 3 illustrates a block diagram of an example of a computational circuit block (CCB) 100 that can be implemented in a computational pipeline of an integrated circuit device that can be flexibly programmed to perform various computations. Computational circuit block 300 includes an arithmetic logic unit (ALU) circuit 350. ALU circuit 350 can be implemented to process floating-point numeric inputs of up to a certain bit length such as 32-bit floating point numbers (FP32). ALU circuit 350 can also be configurable to support numeric inputs of other datatypes such as 8-bit integers (INT8), 16-bit integers (INT16), 16-bit brain floating point numbers (BF16), 16-bit floating point numbers (FP16), or datatypes have a bit length that is less than or equal to the maximum supported datatype bit length. ALU circuit 350 includes a first numeric input 322 selected by an input multiplexor 312, a second numeric input 324 selected by an input multiplexor 314, and a primary result output 352. ALU circuit 350 can be programmed to perform various computational operations on first numeric input 322 and/or second numeric input 324 to generate primary result output 352.

For example, ALU circuit 350 can be programmed to generate primary result output 352 by selecting a computational operation from various available operations to perform on the numeric input(s). The computational operations may include one or more of a passthrough function (or identity function) of the first numeric input 322, bitwise inversion of the first numeric input 322, arithmetic left shift of the first numeric input 322 by a number of bits indicated by the second numeric input 324, arithmetic right shift of the first numeric input 322 by a number of bits indicated by the second numeric input 324, addition of the first numeric input 322 and the second numeric input 324, subtraction of the second numeric input 324 from the first numeric input 322, multiplication of the first numeric input 322 and the second numeric input 324, division of the first numeric input 322 by the second numeric input 324, select the maximum (MAX) of the first numeric input 322 and the second numeric input 324, select the minimum (MIN) of the first numeric input 322 and the second numeric input 324, bitwise AND of the first numeric input 322 and the second numeric input 324, bitwise OR of the first numeric input 322 and the second numeric input 324, bitwise XOR of the first numeric input 322 and the second numeric input 324, logical AND of the first numeric input 322 and the second numeric input 324, logical OR of the first numeric input 322 and the second numeric input 324, logical XOR of the first numeric input 322 and the second numeric input 324, logical left shift of the first numeric input 322 by a number of bits indicated by the second numeric input 324, logical right shift of the first numeric input 322 by a number of bits indicated by the second numeric input 324, etc. In some implementations, the computational operations may also include comparison functions such as whether the first numeric input 322 is equal to, not equal to, greater than, great than or equal to, less than or equal to, and/or less than the second numeric input 324, etc. Other supported computational operations may include an absolute difference between the first numeric input 322 and the second numeric input 324, selection of the first numeric input 322 or the second numeric input 324, and/or other functions to generate a value based on the first numeric input 322 and/or the second numeric input 324. ALU circuit 350 can also be programmed to apply the computational operation with the first numeric input 322 reversed with the second numeric input 324. Although various computational operations have been described, depending on the application and usage of ALU circuit 350, the computational logic within ALU circuit can be simplified to support fewer of the computational operations described above. In some implementations, ALU circuit 350 can also support other computational operations not specifically described.

ALU circuit 350 may include a secondary output 354 to loopback the first numeric input 322 or the second numeric input 324 to computational circuit block 300. This secondary output 354 can provide a swap out path for the ALU circuit 350 to retain a value that was inputted into the ALU circuit 350 (e.g., by storing the value in a swap register 384). This capability of ALU circuit 350 allows a computation pipeline composed of such ALU stages to provide native hardware support for ordering manipulations such as sorting a series of data elements, or finding and locating data elements of a vector being streamed into the pipeline. For example, when ALU circuit 350 is programmed to perform a maximum function, the larger of the first numeric input 322 and the second numeric input 324 can be outputted to the next ALU stage, and the other unselected numeric input can be outputted on the secondary output 354. Similarly, when ALU circuit 350 is programmed to perform a minimum function, the smaller of the first numeric input 322 and the second numeric input 324 can be outputted to the next ALU stage, and the other unselected numeric input can be outputted on the secondary output 354.

Computational circuit block 300 also includes an output register 382 configured to receive the primary result output 352 of ALU circuit 350, and provide the primary result output 352 of ALU circuit 350 as the primary output 380 of computational circuit block 300 to the next CCB. By registering primary result output 352, pipeline stages of computational circuit blocks can be coupled in series to create a computational pipeline in which input values are operated on at each clock cycle by an ALU stage, and the result is provided to the next ALU stage for further processing in the next clock cycle. Computational circuit block 300 also includes a swap register 384 configured to receive the secondary output 354 of ALU circuit 350, and to feedback the secondary output 354 as one of the inputs to the computational circuit block 300 at the next clock cycle. As mentioned above, the swap register 384 can be used to store and retain a value being streamed into computational circuit block 300 to allow efficient search and locate functions to be performed.

Computational circuit block 300 may also include feedback circuitry 370 having one or more feedback registers that are each configured to receive the primary result output 352 of the ALU circuit 350, and provide the primary result output 352 of the ALU circuit 350 to a previous computational circuit block of the pipeline. In some implementations, the feedback circuitry 370 can include multiple feedback registers to enable computational circuit block 300 to maintain and store multiple running computational results on different sets of data elements being streamed into the pipeline. For instance, feedback circuitry 370 may include two feedback registers 372 and 374 that are each individually configured to receive the primary result output 352 of the ALU circuit 350 to feedback to the previous computational circuit block. Each of feedback registers 372 and 374 can have its own independent write enable signals. During operation, computational circuit block 300 can be programmed to sequentially enable writes to the first feedback register 372 alternately with writes to the second feedback register 374 at each clock cycle. This allows computational circuit block 300 to maintain a first computational result in feedback register 372 that are computed from even sequenced data elements, and a second computational result in feedback register 374 that are computed from odd sequenced data elements. For example, feedback register 372 can be used to maintain a running sum of the even sequenced data elements of an input vector, and feedback register 374 can be used to maintain a running sum of the odd sequenced data elements of the input vector. By controlling the independent write enables of the feedback registers, running computational results of other data patterns can also be achieved.

Computational circuit block 300 may also include bypass circuitry 360 having one or more bypass circuits each including a bypass multiplexor coupled to a bypass delay register. Each bypass circuit is operable to independently select one of the inputs of computational circuit block 300 to output to the next computational circuit block of the pipeline on bypass outputs 368. For example, bypass circuitry 360 may include bypass multiplexor 362-1 to select an input for bypass delay register 364-1, and bypass multiplexor 362-n to select an input for bypass delay register 364-n. In some implementations, computational circuit block 300 may include, for example, at least three bypass circuits, six bypass circuits, or other number of bypass circuits. Bypass circuitry 360 enables an input data element or an intermediate computational result to be provided to different ALU circuits in the pipeline such that different operations can be applied to the same value. Bypass circuitry 360 also enables different inputs to be provided to different ALU circuits, and allows the different ALU circuits in the pipeline to operate independently on different sets of inputs.

Computational circuit block 300 may include an input multiplexor for each of the numeric inputs of the ALU circuit 350, as well as a bypass multiplexor for each of the one or more bypass circuits. In the implementation shown in FIG. 3, computational circuit block 300 has input multiplexors 312 and 314, and bypass multiplexors 362-1 to 362-n. Each of these multiplexors may independently select an input from a set of inputs of the computational circuit block 300. For example, input multiplexor 312 may select an input from the set of inputs 302-1 to provide as the first numeric input 322 for ALU circuit 350; input multiplexor 314 may select an input from the set of inputs 302-2 to provide as the second numeric input 324 for ALU circuit 350; bypass multiplexor 362-1 may select an input from the set of inputs 304-1 to provide to bypass delay register 364-1; and bypass multiplexor 362-n may select an input from the set of inputs 304-n to provide to bypass delay register 364-n.

Each set of inputs 302-1, 302-2, 304-1, and 304-n may include one or more of the following inputs: a primary output of the previous computational circuit block of the pipeline (or an input to the pipeline if the first computational circuit block), any of the outputs of the bypass circuits of the previous computational circuit block (or one of the inputs to the pipeline if the first computational circuit block), the primary output 380 of the computational circuit block 300 itself, the output of the swap register 384, and/or any of the outputs of the feedback registers of the next computational circuit block. In some implementations, the set of inputs 304-1 to 304-n selectable by the bypass multiplexors can be the same set of inputs, and the set of inputs 302-1 and 302-2 selectable by the input multiplexors can be the same set of inputs. Furthermore, the set of inputs 304-1 to 304-n can be the same as the set of inputs 302-1 and 302-2. In some implementations, the set of inputs 304-1 to 304-n may overlap with the set of inputs 302-1 and 302-2, and may include one or more inputs not included in the set of inputs 302-1 and 302-2. The set of inputs 302-1 and 302-2 may also include one or more inputs not included in the set of inputs 304-1 to 304-n. The set of inputs 302-1 may also include one or more inputs not included in the set of inputs 302-2, or vice versa. Similarly, any of the sets of inputs 304-1 to 304-n may include different sets of inputs. Having each of the multiplexors able to select from the full set of inputs to the computational circuit block 300 may provide the most flexibility to program the computational circuit block 300 to perform various types of computations.

It should be noted that although computational circuit block 300 has been shown in FIG. 3 to include various features such as bypass circuitry 360, feedback circuitry 370, and swap register 382, other implementations of the computational circuit block may omit one or more components. For example, a computational circuit block may include just one feedback register, or may include feedback circuitry without bypass circuitry, or may include bypass circuitry without feedback circuitry, etc. Furthermore, computational circuit block 300 may include other components not specifically shown.

Figure 4:
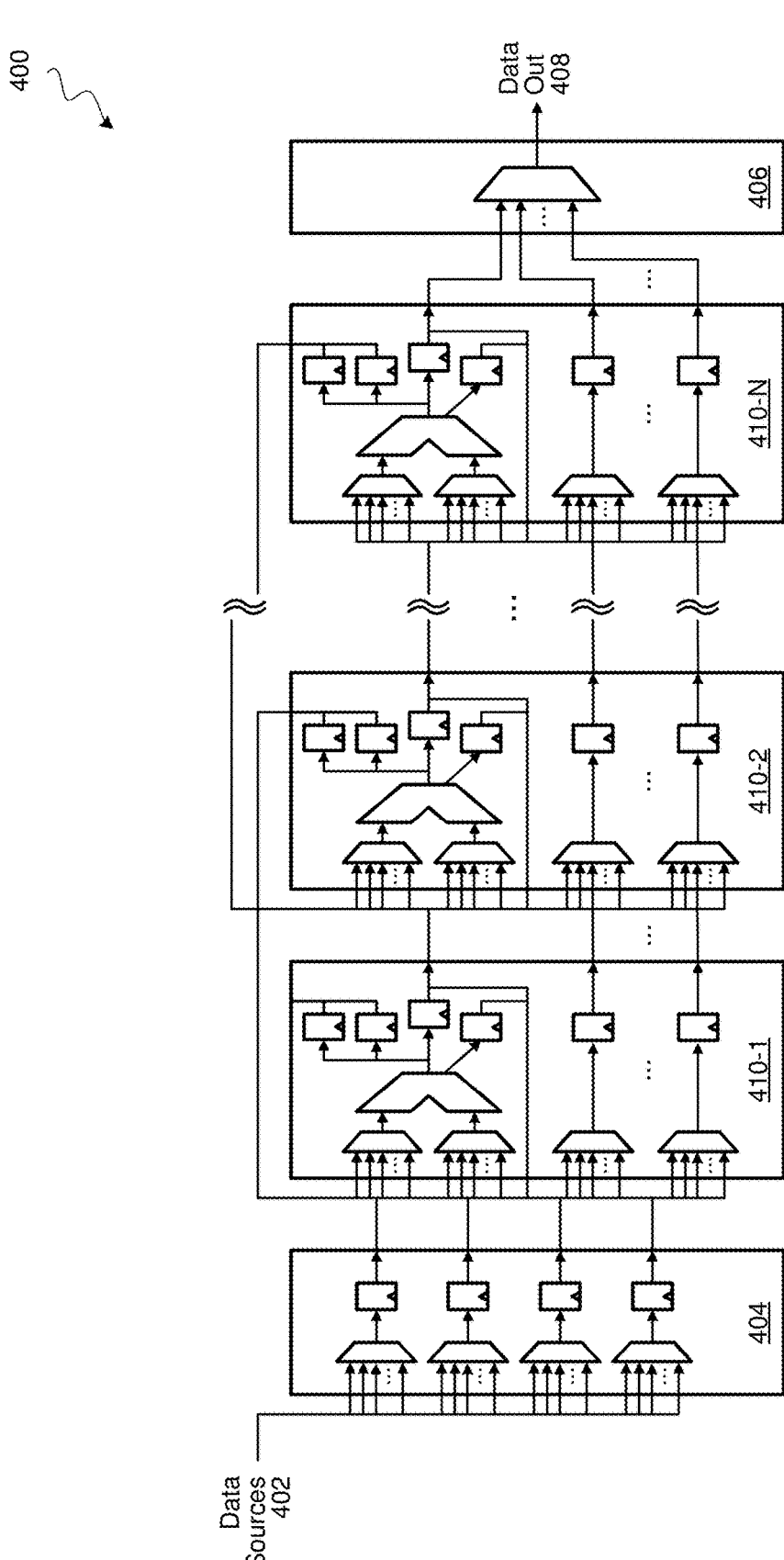
FIG. 4 illustrates a block diagram of an example of an integrated circuit implementing a compute channel.

FIG. 4 illustrates an example of an integrated circuit 400 having a compute channel formed by coupling multiple computational circuit blocks in series in a pipeline. Integrated circuit 400 can be implemented, for example, in an execution engine of a data processor (e.g., a data processing integrated circuit device such as a processor, a graphics processor, a digital signal processor, a tensor processor, a neural network accelerator, or other types of application specific integrated circuits). Integrated circuit 400 includes multiple computational circuit blocks 410-1 to 410-N coupled in series. The number of computational circuit blocks N can be at least four, at least eight, at least ten, at least sixteen, or other suitable number. For example, integrated circuit 400 may include right computational circuit blocks coupled in series, and can be programmed to implement computational pipeline 100 to compute the mean and variance for a set of data elements.

Each computational circuit block in integrated circuit 400 can be implemented, for example, using computational circuit block 500. It should be noted that not each of the computational circuit blocks 410-1 to 410-N needs to be identical. For example, the first computational circuit blocks 410-1 does not have a previous computational circuit block to receive feedback outputs from the feedback circuitry. As such, the feedback circuitry can be omitted from the first computational circuit blocks 410-1. More generally, the components provided in each computational circuit block in the pipeline can be the same, or can vary depending on the application.

Each of computational circuit blocks 410-1 to 410-N includes an ALU circuit, and thus the pipeline in integrated circuit 400 can be considered as an ALU pipeline having multiple ALU stages coupled in series. Each ALU stage has a first numeric input, a second numeric input, and a primary result output. Each of the ALU stage is programmable to perform a computational operation on the first numeric input and/or the second numeric input of the ALU stage to generate the primary result output. The primary result output is provided to the next computational circuit block, which may select that primary result output as one of the numeric inputs to the ALU. For example, the primary result output of computational circuit block 410-1 is provided as an input to computational circuit block 410-2, and computational circuit block 410-2 may select the primary result output of computational circuit block 410-1 as one of the numeric inputs to the ALU stage of computational circuit block 410-2. Computational circuit block 410-2 can also select the primary result output of computational circuit block 410-1 to bypass the ALU stage and be outputted to the next computational circuit block 410-5 using the bypass circuitry.

Each of computational circuit blocks 410-1 to 410-N can be independently configured such that some or all of the ALU stages perform a different computational operation. Likewise, some or all of the ALU stages in the pipeline can be configured to perform the same computational operation. The multiplexors at the input interface of each computational circuit block can be independently configured to select any of the inputs that the computational circuit block receives. The bypass circuitry provided in each computational circuit block can also allow the computational circuit blocks in the pipeline to operate independently on different inputs.

For instance, a first set of inputs can flow into the first ALU stage of computational circuit block 410-1, and the result of the first ALU stage can flow into the second ALU stage of computational circuit block 410-2. The result of the second ALU stage of computational circuit block 410-2 can then be provided along a bypass path. For example, the bypass multiplexor of the next computational circuit block can select the primary output of computational circuit block 410-2, and provide the primary output of computational circuit block 410-2 along the bypass path down the pipeline to the subsequent computational circuit blocks. The primary output of computational circuit block 410-2 can be outputted by the bypass circuitry of the last computational circuit block 410-N.

Meanwhile, a second set of inputs can be provided along the bypass circuitry of computational circuit blocks 410-1 and 410-2. The input multiplexors for the ALU stage of the next computational circuit block can select these second set of inputs as the numeric inputs for the ALU. For example, the first input multiplexor and the second input multiplexor can select respective outputs of the bypass circuits of computational circuit block 410-2 to be used as the numeric inputs to the ALU circuit. The remaining ALU stages in the pipeline can operate on the result from this ALU circuit with the final result being outputted as the primary output of the last ALU stage of computational circuit block 410-N.

Hence, in this specific example, the first two ALU stages operate together on the first set of inputs, and the remaining ALU stages operate together on the second set of inputs. The bypass circuitry allows the two groups of ALU stages to operate independently from each other. In other scenarios, it's also possible to have two groups of ALU stages operate independently, and the results can be combined at a later ALU stage. These are just a few examples of the flexibility that the bypass circuitry provides on different ways that the pipeline can be configured and utilized.

In some implementations, the ALU pipeline can be designed to have no stalls such that data elements can be streamed into the pipeline at every clock cycle to maximize throughput. In other words, the pipeline can be designed to process a new data element at every clock cycle. In some scenarios, a data bubble (e.g., clock cycle with no valid data) may occur in the data stream inputted into the pipeline. This may occur, for example, if the memory streaming the data elements into the pipeline or the memory being written with the computational result outputted from the pipeline is busy or reaches a bandwidth limit, causing a temporary pause. In such scenarios, a nop (no operation) instruction can be executed by the ALU pipeline in each clock cycle of the temporary pause until the data stream resumes.

For computations that may have multicycle feedback loops such as the mean computation, the computational circuit block feeding back the running computational results can be implemented with multiple feedback registers. When a data bubble is encountered, the computational circuit block can safely maintain the separate running computational results in respective feedback registers. During operation, the enables for the feedback registers can be sequentially toggled or toggled according to certain data patterns to track separate running computational results. When a pause in the data stream is encountered, the enables to the feedback registers can be disabled such that the running computational results are retained and stored separately in the feedback registers. When the data stream is restarted, the toggling of the enables for the feedback registers can be resumed to continue tracking the separate computational results. Hence, by having multiple feedback registers to maintain and store respective running computational results, data bubbles in the data stream can be handled properly without causing the multiple running computational results to go out of synch.

In addition to the computational circuit blocks 410-1 to 410-N, integrated circuit 400 may also include an input circuit 404 and an output circuit 406. Input circuit 404 is operable to provide input data selectable from multiple data sources 402 to the pipeline of computational circuit blocks 410-1 to 410-N. In some implementations, the data sources 402 may include a first tensor stored in a memory subsystem, a second tensor stored in a memory subsystem, a parameter table storing preloaded values, a pseudo-random number generator such as a linear feedback shift register, and/or a counter (e.g., that counts the number of input data elements). The selectable data sources 402 can include two vectors from memory, because the ALU pipeline can be used to perform element-wise computations on the two vectors simultaneously streamed into the pipeline to generate an output vector. The selectable data sources 402 may also include a programmable constant value, a zero value, a floating-point one value, an integer one value, a value representing positive infinity, and/or a value representing negative infinity, etc. In some implementations, the selectable data sources 202 may also include a power of two value (e.g., 8, 16, 24, etc.) which can be used for shifting or masking operations, and/or a bit mask value for masking one or more bytes (e.g., 0xff, 0xff00, 0xff0000 0xff000000, 0xffff, 0xffff0000, 0xffffff00, 0xffffffff, etc.). Each of the multiplexors in the input circuit 404 can independently select the same or different data source to provide to the first computational circuit block 410-1.

At the end of the ALU pipeline, the last computational circuit block 410-N can be coupled to an output circuit 406. The output circuit 406 is operable to select between a primary output of the last computational circuit block 410-N and the respective outputs of the bypass circuits of the last computation circuit block 410-N as data output 408 to write to memory. In some implementations, output circuit 406 can be controlled to write the data output 408 to memory under certain prescribed conditions. For example, integrated circuit 400 can be configured to write the data output 408 to memory only when a predicate condition programmed in an ALU stage is met (e.g., the first numeric input of the designated ALU stage is equal to the second numeric input), or when a tensor subdimension overflows (e.g., write the data output to memory at every filter size number of data elements for a pooling operation).

Figure 5:
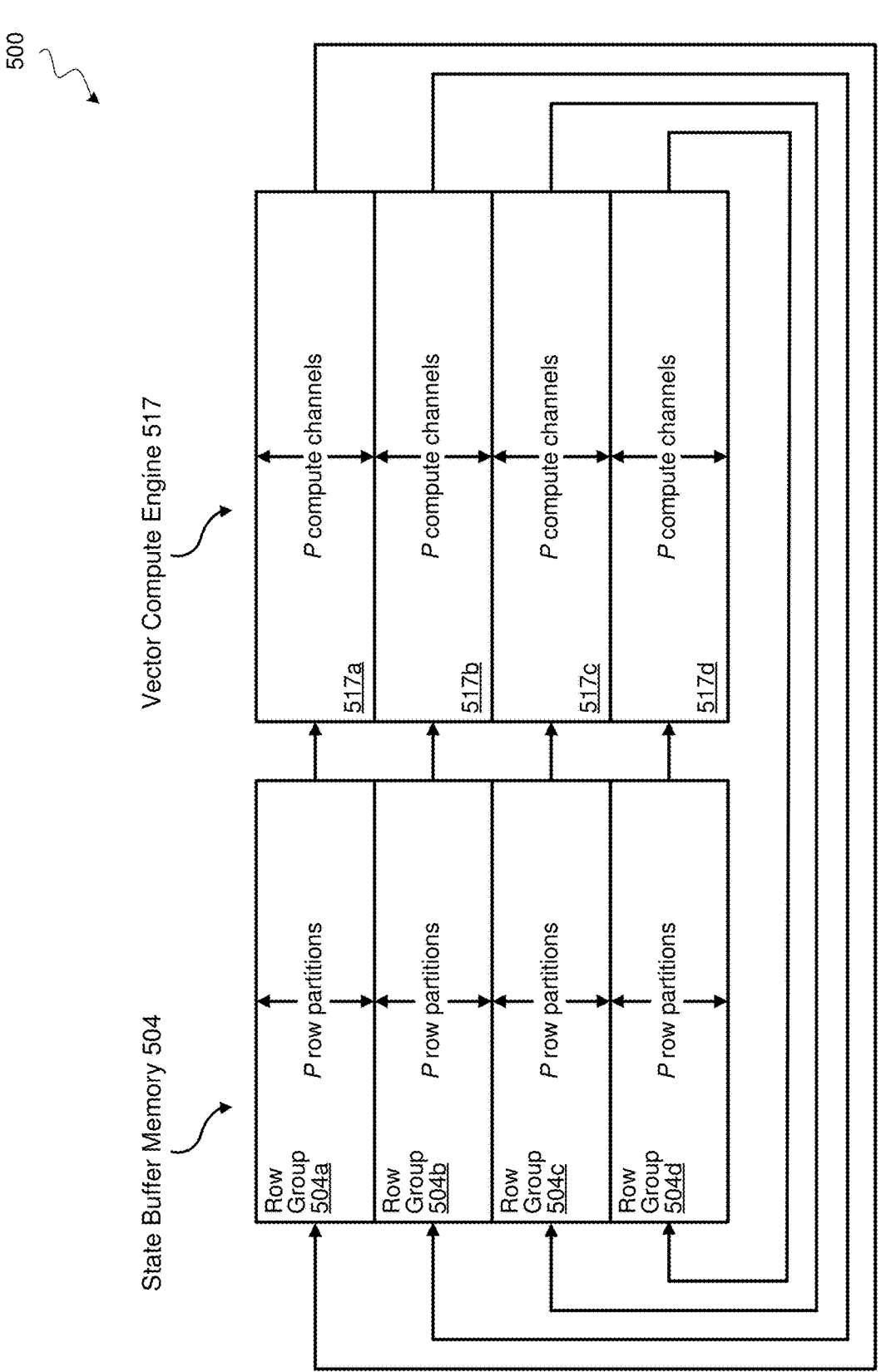
FIG. 5 illustrates a block diagram of an example of a portion of an accelerator.

FIG. 5 illustrates a block diagram of an example of a portion of a neural network accelerator 500 that includes a vector compute engine 517. Neural network accelerator 500 may include other components not specifically shown such as a processing engine (PE) array (e.g., a systolic array tailored for matrix multiplication operations), a result buffer for storing outputs of the PE array, and/or other compute engines. Vector compute engine 517 may include multiple vector compute banks. In the example shown, vector compute engine 517 has four vector compute banks 517a to 517d. Each of the vector compute banks 517a to 517d may include P number of compute channels. Each compute channel can be implemented, for example, using integrated circuit 400, and may include a computational pipeline of ALU circuits coupled in series.

Neural network accelerator 500 may also include a state buffer memory 504. In some implementations, state buffer memory 504 can be an on-chip memory, and may act as a cache to store tensors or matrices for neural network accelerator 500 to process. For example, state buffer memory 504 may store tensors representing input data such as feature maps, weight values, and/or intermediate results of in-progress computations of a neural network. State buffer memory 504 may include multiple row partitions organized into row groups. In the example shown, state buffer memory 504 has four row groups 504a to 504d, and each of the row groups includes P number of row partitions. Hence, if state buffer memory 504 has 128 row partitions, then each row group may have 52 row partitions.

Vector compute engine 517 may read data from the row partitions of state buffer memory 504, and may include the same number of compute channels as the number of row partitions. For example, if there are 128 row partitions in state buffer memory 504, vector compute engine 517 may include 128 compute channels such that the data from each row partition can be processed by a corresponding compute channel. The data being inputted to a compute channel may correspond to a vector of a tensor stored in state buffer memory 504. By having multiple compute channels, vector compute engine 517 can process multiple vectors of a tensor in parallel.

The vector compute banks 517a to 517d are coupled to respective row groups 204a to 204d of state buffer memory 504. Hence, each vector compute bank processes data from a corresponding row group. As shown in FIG. 5, the output of each vector compute bank can be written back to the corresponding row group of state buffer memory 504. Each of the vector compute banks 517a to 517d can be configured independently from each other to process data from their respective row groups 504a to 504d. Vector compute banks 517a to 517d (or a subset thereof) may also operate collectively to process data from a tensor that spans multiple row groups.

A compute channel in vector compute engine 517 may perform certain computations on the data elements read from a row partition of state buffer memory 504. For example, the compute channel may count the number of data elements being streamed into the compute channel, calculate a mean and/or a variance of the data elements, and write back the count, mean, and/or variance values to the corresponding row partition of state buffer memory 504. Such computations can then be used to perform tensor normalization or tensor reduction. For example, the computed mean and/or variance can be used to scale and/or offset each data element being streamed into the compute channel, and write back the modified data elements to the corresponding row partition of state buffer memory 504. Other types of computations that a compute channel may perform can include performing a pooling operation to down-sample a tensor, finding the maximum/minimum value, and/or sorting the data elements in ascending/descending order, etc. before writing back the data elements to the corresponding row partition of state buffer memory 504

The compute channels in vector compute engine 517 can operate in parallel and generate outputs in parallel. Each of the parallel outputs generated by the compute channels can be generated from a corresponding vector inputted into vector compute engine 517. The output generated from a compute channel can be an output vector generated by applying an elementwise operation to each element of the vector inputted into the compute channel. In other words, when a vector of T elements is streamed into a compute channel, the compute channel may output T number of elements processed by the compute engine. Such operation can be used, for example, to scale and/or apply an offset to each of the data elements streamed into the compute engine. The output of a compute channel can also be one or more output values generated by performing one or more computations on a combination of data elements of the vector inputted into the compute channel. For example, the output value(s) can be a mean computed over the data elements streamed into the compute channel, and/or a variance computed over the elements streamed into the compute channel. In some implementations, the compute channel may output the mean, variance, and count of the elements inputted into the compute channel from a single pass of the elements steamed into the compute channel.

In the context of executing a neural network, vector compute engine 517 can be used to complement and/or offload computations from the PE array (not shown) of neural network accelerator 500. For example, vector compute engine 517 can be used to perform tensor normalization of a tensor stored in state buffer memory 504 prior to inputting the tensor into the PE array for matrix multiplication operations. Although vector compute engine 517 is shown to read from and write back to state buffer memory 504, vector compute engine 517 can also process data read from a results buffer that stores output from the PE array. More generally, vector compute engine 517 may read input from state buffer memory 504 and/or the results buffer, and write the computational outputs to state buffer memory 504 and/or the results buffer. It should also be noted that although vector compute engine 517 has been described in the context of a neural network accelerator, vector compute engine 517 can be implemented in other types of data processors such as central processing units (CPUs), graphics processing units (GPUs), digital signal processors (DSPs), etc.

Figure 6:
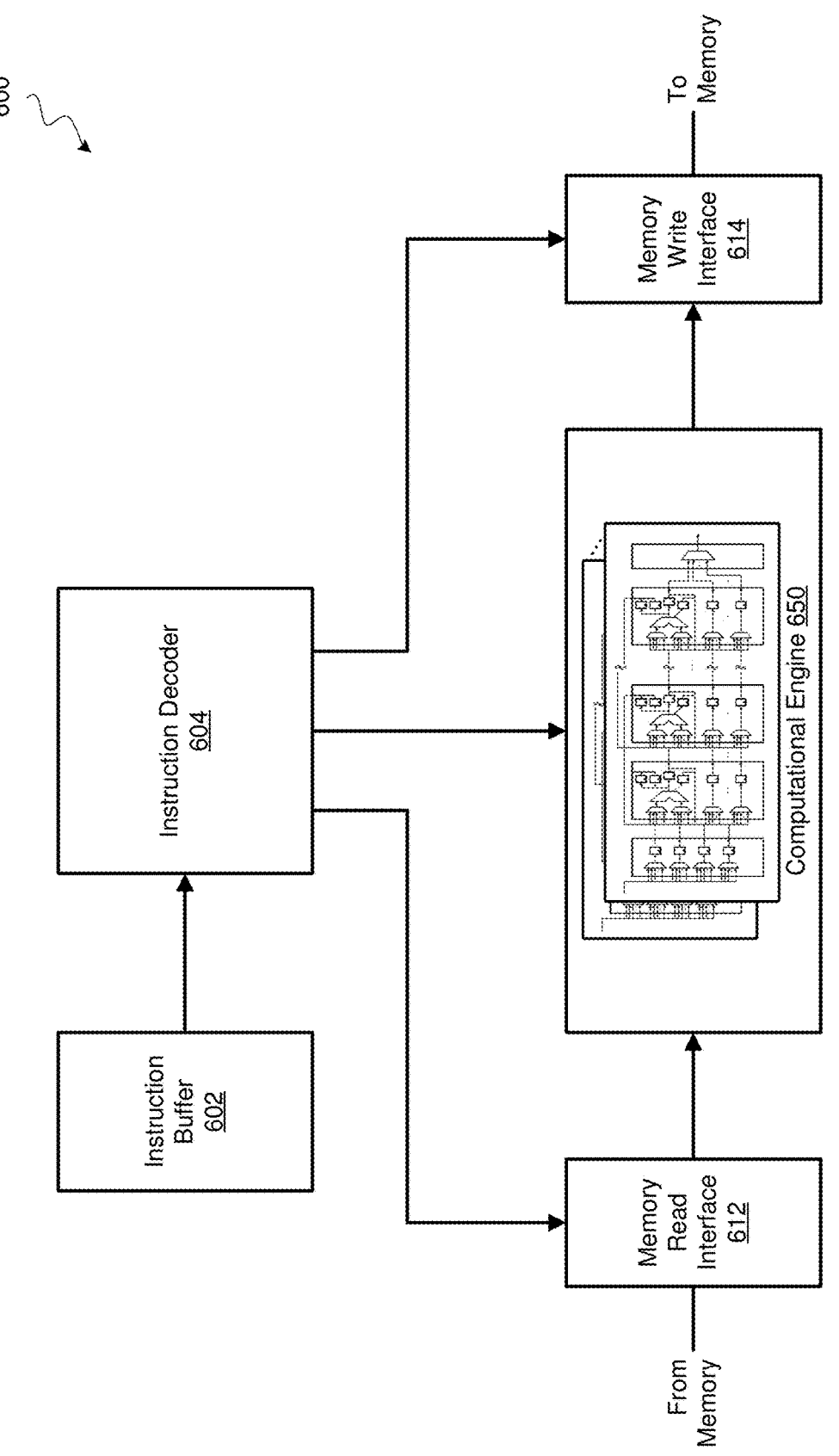
FIG. 6 illustrates a block diagram of an example of an execution engine.

FIG. 6 illustrates a block diagram of an example of an execution engine 600. Execution engine 600 can be part of a data processor (e.g., a data processing integrated circuit device such as a processor, a graphics processor, a digital signal processor, a tensor processor, a neural network accelerator, or other types of application specific integrated circuits). Execution engine 600 can include a computational engine 650, and may provide a programming in interface for the computational engine 650. In some implementations, computational engine 650 can be, for example, a vector compute engine.

Execution engine 600 includes an instruction buffer 602, an instruction decoder 604, a memory read interface 612, a memory write interface 614, and a computational engine 650. Instruction buffer 602 stores a set of pending machine instructions that are executable by execution engine 600 to perform certain functions or operations. Instruction buffer 602 may include a set of entries in which each entry stores a single machine instruction. The machine instructions can be, for example, assembly-type instructions and can be part of an instruction set for the data processor architecture. Examples of instruction sets may include ARM instruction set, MIPS instruction set, x86 instruction set, or other types of proprietary instruction set tailored for a certain data processor architecture.

Instruction decoder 604 is configured to retrieve or obtain a machine instruction from instruction buffer 602, and includes instruction decoder circuitry to decode the machine instruction to determine the actions to be taken by execution engine 600. For example, instruction decoder 604 may decode a machine instruction to extract various fields including an opcode, and one or more operands (depending on the opcode) to allow execution engine 600 to perform the intended operations. In some implementations, instruction decoder 604 may decode a complex instruction into multiple opcodes and corresponding optional operands. Instruction decoder 604 may also drop or discard unrecognizable or invalid instructions.

The fields extracted by instruction decoder 604 can be used to lookup configuration profiles to program or configure computational engine 650 to perform certain functions. The extracted fields from the machine instruction may also identify locations in memory to retrieve data for computational engine 650 to process, and identify locations in memory to write the results outputted from computational engine 650. In some implementations, computational engine 650 may interface with one or more memories via memory read interface 612 and memory write interface 614. Computational engine 650 can be communicatively coupled between two memories, and may read from one memory and write to another, and/or read and write to the same memory. For example, in implementation in which execution engine 600 is a vector engine or a pooling engine, computational engine 650 may interface with a state buffer memory and a partial sum result buffer memory. Computational engine 650 may obtain data to process from either or both of these buffer memories via memory read interface 612, and may write the output to either or both of these buffer memories via memory write interface 614.

Computational engine 650 can include multiple execution channels to perform parallel data processing. Each of the execution channel can be implemented as a processing circuit with multiple computational circuit blocks coupled in series to form a pipeline. For example, in some implementations, an execution channel can be implemented using integrated circuit 400, and may include at least eight computational circuit blocks, and thus at least eight pipeline stages. Each of the computation circuit blocks includes a programmable ALU circuit that can be programmed to perform various functions depending on the machine instruction being executed by execution engine 600. The computational circuit block can be implemented using any of the computational circuit blocks described herein such as computational circuit block 300.

The machine instructions executed by execution engine 600 can be generated by a compiler. In the context of neural networks, a compiler can compile a description of a neural network model to generate machine instructions for execution engine 600 to execute.

FIG. 7 illustrates a flow diagram of a process 700 for generating machine instructions to perform a tensor normalization operation. The tensor normalization operation can be, for example, a batch normalization operation that is performed on inputs to a layer of a neural network. Process 700 can be performed, for example, by a compiler that interprets programming code describing a neural network model, and translates the programming code into machine instructions for execution on hardware. In some implementations, process 700 can be implemented on a computer-readable medium that is executable by a processor of a computing system to compile the programming code of neural network model for loading onto a data processor for execution. For example, the compiled machine instructions can be executed on execution engine 600.

Process 700 may begin at block 702 by receiving a description of the neural network model. The description of the neural network model can be, for example, in a programming language such as Java, C++, Python, Tensorflow, PyTorch, etc. among many other examples. In some implementations, a directed acyclic graph can be generated based on the computations and data flow provided in the description of the neural network model. The neural network model may include various layers, and the description of the neural network model may indicate one or more input tensors to the layers be subjected to a tensor normalization operation.

At block 704, a determination is made that the neural network model includes a tensor normalization operation. The programming language that the description of the neural network mode is written in may include function calls to perform a tensor normalization operation such as batch normalization function call. The determination can be made, for example, by parsing the description of the neural network to identify location in the code of such function calls.

At block 706, process 700 may generate a batch statistics machine instruction. The batch statistics machine instruction, when executed by a compute engine, may serially input data elements of a tensor from a memory into a compute channel, and compute a first mean and a first variance associated with data elements of the tensor having even sequence indices as well as a second mean and a second variance associated with the data elements of the tensor having odd sequence indices. The results, which may be referred to as the even and odd means/variances, can be written back to memory. The compute channel can be implemented, for example, using integrated circuit 400. In some implementations, the batch statistics machine instruction may configure the compute channel to operate as compute channel 100, for example, by configuring the computational operation performed by each compute stage and selecting the proper inputs and bypass paths for each compute stage. In some implementations, the batch statistics machine instruction may also cause the compute channel to output a count of the number of data elements (e.g., number of even sequenced data elements and/or number of odd sequenced data elements). The count values can be used to combine means and variances computed over subsets of data to generate a mean and variance for the full set of data.

At block 708, process 700 may generate an aggregate machine instruction. The aggregate machine instruction, when executed by a compute engine, may input the even and odd means, the even and odd variances, and the respective counts of data elements into a compute channel. The compute channel may aggregate the first mean and the second mean to compute a mean for the full set of data elements, and aggregate the first variance and the second variance to compute a variance for the full set of data elements. The computed mean and variance can be written back to memory. It should be noted that multiple compute channels can operate in parallel on vectors of a tensor, and that the various odd and even means and variances generated by each compute channel can all be aggregated together using the aggregate machine instruction.

At block 710, process 700 may generate a tensor scale machine instruction to normalize the tensor based on the computed mean and the computed variance. The tensor scale instruction, when executed by a compute engine, may serially input data elements of a tensor from a memory into a compute channel, offset each data element by the mean, and scale each data element by the variance. The modified tensor can be written back to memory. Hence, to perform a tensor normalization operation contained in the description of the neural network model, the compiler may generate a batch statistics machine instruction, an aggregate machine instruction, and a tensor scale instruction. The generated machine instructions can then be stored as part of the compiled code (e.g., in a binary file) for loading onto a data processor.

FIG. 8 illustrates a flow diagram of an example of a process 800 for training a neural network. Process 800 can be performed, for example, by a data processor (e.g., a data processing integrated circuit device such as a processor, a graphics processor, a digital signal processor, a tensor processor, a neural network accelerator, or other types of application specific integrated circuits).

At block 802, the data processor may receive an input tensor representing training data to train a neural network. The input tensor can represent, for example, feature map inputs. The input tensor can be an input to an initial layer of the neural network, or an input to an intermediate or hidden layer of the neural network.

At block 804, a normalization operation can be performed on the input tensor. The normalization operation may include streaming data elements of a vector of the input tensor from a memory into a vector compute channel having a pipeline formed by coupling a series of compute stages in series. In some implementations, reciprocals of sequence indices from a parameters table can also be streamed into the vector compute channel in parallel with the data elements of the vector The vector compute channel can be implemented, for example, using integrated circuit 400, and may include eight compute stages coupled in series. The vector compute channel may compute a first running mean and a first running variance associated with data elements of the vector having even sequence indices, and a second running mean and a second running variance associated with data elements of the vector having odd sequence indices from a single pass of streaming the data elements into the vector compute channel.

To compute the running means and variances, the vector compute channel may process each of the data elements being streamed into the vector compute channel as follows. At a first compute stage of the vector compute channel, a multiplication of the data element with a reciprocal of a sequence index of the data element can be performed. At a second compute stage of the vector compute channel, subtraction of the reciprocal of the sequence index of the data element from a floating-point value of one can be performed. At a third compute stage of the vector compute channel, multiplication of an output of the second compute stage with a previous mean value computed for a previous data element of the vector can be performed. At a fourth compute stage of the vector compute channel, addition of an output of the third compute stage to an output of the second compute stage can be performed to compute a mean value for the data element.

At a fifth compute stage of the vector compute channel, subtraction of the mean value from the data element can be performed. At a sixth compute stage of the vector compute channel, subtraction of the previous mean value from the data element can be performed. At a seventh compute stage of the vector compute channel, multiplication of an output of the fifth compute stage with an output of the sixth compute stage can be performed. At an eighth compute stage of the vector compute channel, addition of a previous variance value computed for the previous data element to an output of the seventh compute stage can be performed to compute a variance value for the data element.

The normalization operation at block 804 may also include aggregating the first running mean and the second running mean to compute a mean of the data elements of the vector, and aggregating the first running variance and the second running variance to compute a variance of the data elements of the vector. The input tensor can then be modified to generate a normalized input tensor based on the computed mean and the computed variance. For example, the modification made to the data elements may include offsetting each data element by the mean, and scaling each data element by the variance. The normalized input tensor can then be written back to the memory.

At block 806, the neural network can be trained using the normalized input tensor. The training process may include inputting the normalized input tensor into the neural network model, comparing the outputs of the model with the expected outputs using a loss function, and modifying the weight values of the neural network model based difference between the outputs and the expected outputs (e.g., using a gradient descent algorithm).

FIG. 9 illustrates a flow diagram of an example of a process 900 for computing mean and variance for a set of data elements. Process 900 can be performed, for example, by an integrated circuit device having multiple compute stages coupled in series in a pipeline to form a compute channel. For example, the integrated circuit device may include eight compute stages, and can be implemented using compute channel 100 or integrated circuit 400. In some implementations, the integrate circuit device may include a parameters table to provide precomputed values to the compute stages.

Process 900 may begin at block 902 by serially inputting data elements of a vector into a compute channel. In some implementations, reciprocals of sequence indices corresponding to the data elements can also be serially inputted into the compute channel in parallel with the data elements of the vector. The reciprocals of sequence indices can be inputted, for example, from a parameter table that is preloaded with the reciprocal values.

At block 904, the compute channel may generate a first running mean and a first running variance associated with data elements of the vector having even sequence indices, and a second running mean and a second running variance associated with data elements of the vector having odd sequence indices. For example, the compute channel can be configured in accordance with compute channel 100 to concurrently track and update the running means and variances as new data elements are streamed into the compute channel. For example, some of the processing described above for block 804 of process 800 can be used to generate the running means and variances.

In some implementations, the compute channel may include a compute stage that toggles between updating the first running mean and updating the second running mean at each clock cycle. The compute stage may include a first feedback register to store the first running mean, and a second feedback register to store the second running mean. In some implementations, the compute stage for tracking and updating the means can be the fourth compute stage of the pipeline. In some implementations, the compute channel may include a compute stage that toggles between updating the first running variance and updating the second running variance at each clock cycle. The compute stage may include a first feedback register to store the first running variance, and a second feedback register to store the second running variance. In some implementations, the compute stage for tracking and updating the variances can be the eighth compute stage of the pipeline. In addition to outputting the means and variances, the compute channel may also output a count of the number of the data elements of the vector. This may include a count of the number of the data elements of the vector having even sequence indices and a count of a number of the data elements of the vector having odd sequence indices.

At block 906, the first running mean and the second running mean are aggregated to generate a mean associated with the data elements of the vector. At block 908, the first running variance and the second running variance are aggregated to generate a variance associated with the data elements of the vector. The mean and variance can be used, for example, to normalize an input tensor. The normalized input tensor can improve the training process and reduce training times. The mean and variance can also be used for other operations that utilizes these values.

Figure 10:
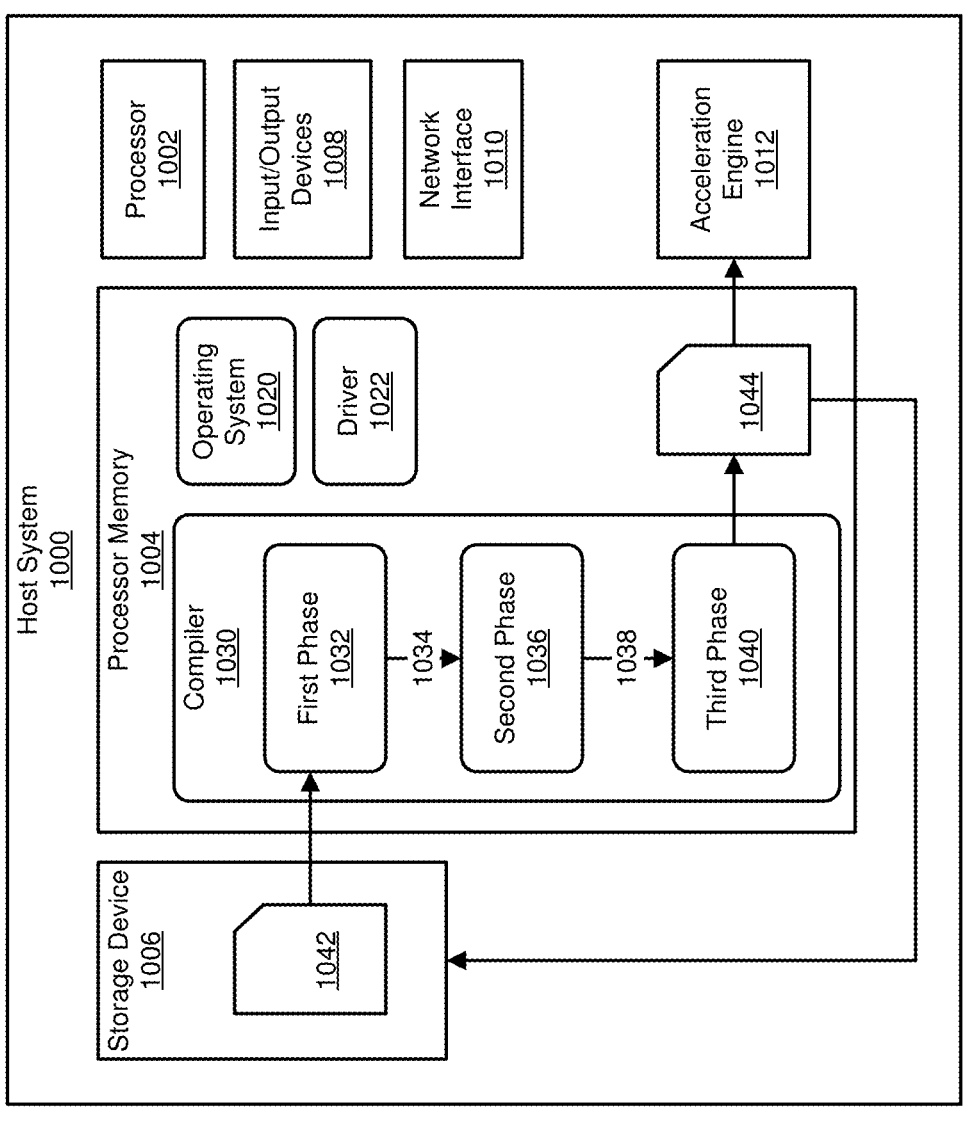
FIG. 10 illustrates a block diagram of an example of a compiler in a host system.

FIG. 10 illustrates a block diagram of an example of a host system 1000 on which a compiler 1030 can run. The illustrated host system 1000 is an example of a computing device, and includes a processor 1002, a processor memory 1004, at least one storage device 1006, various Input/Output (I/O) devices 1008, and at least one network interface 1010. In the example of FIG. 10, the host system 1000 also includes an acceleration engine 1012, which is an integrated circuit device that can accelerate certain operations or computations performed by the host system 1000. In various examples, the host system 1000 can be implemented as a server in a data center, a desktop computer, a laptop computer, a tablet computer, or a smartphone, among other examples. In some examples, operations or components discussed below as being performed or included in the host system 1000 can be performed or included in other computer devices. For example, the compiler 1030 can execute on the host system 1000 while the acceleration engine 1012 is located in a different host system or different computing device.

The processor 1002 is an integrated circuit device that can execute program code, in the form of instructions. The program code can be for various software applications or tools, such as an operating system 1020 or the illustrated compiler 1030. While the processor 1002 is executing a program, the instructions for the program can be stored in the processor memory 1004. The instructions can also be stored elsewhere, such as on the storage device 1006, and can be loaded into the processor memory 1004 when needed by the processor 1002. The processor 1002 can also use the processor memory 1004 for temporary storage of other data that the processor 1002 is operating on. In various examples, the processor memory 1004 is a volatile memory type, such as a type of random access memory, though non-volatile memory types can, alternatively or additionally, be used for the processor memory 1004.

The storage device 1006 is an example of a device that can include non-volatile memory. For example, the storage device 1006 can be a magnetic disk drive, a solid-state drive, or an optical drive, among other examples. Program code and other data stored on the storage device 1006 can remain present when the storage device 1006 is not powered on. Storage device 1006 can be uses as a type of non-transitory storage medium, or may include a reader that can access non-transitory storage medium.

The storage device 1006 is one example of a peripheral device. A peripheral device is a component that can be coupled to the host system 1000 to add functionality to the host system 1000. Other examples of peripheral devices include Input/Output devices 1008 and network interface 1010. The Input/Output devices 1008 can include user input and/or output devices, such as keyboard, mouse, pointer, touchpad, touchscreen, microphone, display screen, speaker, printer, and scanner, among other examples. Network interface 1010, which can be implemented using a network interface card, can provide access to one or more networks. Network interface 1010 can include, for example, a physical port for connecting a network cable and/or one or more antennas and/or radios for wireless communication such as Wi-Fi, cellular, and/or other over-the-air networks. Network interface 1010 can also be described as an I/O device.

The acceleration engine 1012 is also another type of peripheral device or I/O device. The acceleration engine 1012 is a device that is purpose-built to perform certain operations that can be performed by the processor 1002, but can be performed faster by the acceleration engine 1012. For example, the acceleration engine 1012 can be a neural network accelerator that is capable of performing large scale, parallel computations of a neural network more efficiently than when the computations are performed by the processor 1002. As another example, the acceleration engine 1012 can be a graphics processing unit (GPU), and may be optimized to perform the computations needed for graphics rendering. Other examples of devices that can be implemented by the acceleration engine 1012 include cryptographic accelerators, compression and decompression accelerators, 3-D accelerators, regular expression accelerators, security accelerators, and others.

In various examples, the acceleration engine 1012 can execute program code to perform certain operations. For example, when the acceleration engine 1012 is a neural network accelerator, the acceleration engine 1012 can be programmed to execute a particular neural network model, such as one that performs image recognition or one that performs machine translation. As a further example, to support the execution of a neural network model, the acceleration engine 1012 can be programed to perform operations such as copying data for the neural network between processor memory 1004 and the acceleration engine 1012 (e.g., copying input data for the neural network from processor memory 1004 into the acceleration engine 1012, copying results from the acceleration engine 1012 into the processor memory 1004, etc.).

To generate program code for the acceleration engine 1012, the host system 1000 can execute the compiler 1030. Compilers, in general, are software programs that translate program code written in a human-readable language into a format (e.g., machine instructions) that can be read and processed by an integrated circuit device. In the example of FIG. 10, the acceleration engine 1012 can be a neural network accelerator, and the compiler 1030 can be a compiler for compiling a neural network description into instructions to be executed by the acceleration engine 1012. When the acceleration engine 1012 implements a different type of accelerator, a different compiler can be used.

The compiler 1030 can be activated, for example, when the operating system 1020 receives keyboard, mouse, touchscreen, voice command, or other inputs from the Input/ Output devices 1008. The inputs can further include parameters for the compiler 1030, such as input code 1042 to compile and configuration options for the compilation process. Once the compiler 1030 is activated, the processor

1002 can load the instructions for the compiler 1030 into the processor memory 1004, and execute the compiler from the processor memory 1004. In some implementations, compiler 1030 may identifying steps to be performed by the processor 1002, rather than by the acceleration engine 1012. For example, the processor 1002, through the execution of a driver 1022, may need to perform steps such as configuring Direct Memory Access (DMA) descriptors for moving data into or out of the acceleration engine 1012, among other examples.

In the example of FIG. 10, the compiler 1030 includes a first stage 1032, a second stage 1036, and a third stage 1040, which each perform different operations to produce compiled code 1044. In other examples, the compiler 1030 can combine the operations of the first stage 1032, second stage 1036, and/or third stage 1040 into fewer stages, or can divide the operations of one or more of the stages into multiple stages. In some implementations, compiler 1030 can also be modified such that certain operation(s) from one stage can be executed in a different stage.

The first stage 1032 (may also be referred to as the front stage) can receive and process input code 1042. The input code 1042 can describe a program in a high-level programming language, such as Python, Java, C++, among other examples, and may utilize software libraries tailored for neural networks such as TensorFlow, PyTorch, etc. The input code 1042 can be a description of a neural network model that describe, for example, steps to perform image recognition, speech recognition, machine translation, or other operations. The input code 1042 can be obtained from the storage device 1006. Alternatively, though not illustrated, the input code 1042 can be located in the processor memory 1004, or can be obtained from a network location using the network interface 1010.

Processing of the input code 1042 can include parsing the input code 1042, performing syntax and semantic analysis on the input code 1042 to identify operators (e.g., operations such as computations, memory accesses, and/or other functions, etc.) described in the input code 1042, and sorting the operators described in the input code 1042. For example, the operators described in the input code 1042 can be sorted into layers, where the outputs of one layer provide the inputs to a next layer. The output of the first stage 1032 can be an intermediate representation (IR) 1034 of the input code 1042. In some implementations, the IR 1034 can be code representing a compute graph (e.g., data flow graph, data dependency graph, etc.). The compute graph may include nodes and edges connecting the nodes. The nodes may represent operators such as computations, data rearrangements such as transformations, memory accesses, and/or other operations; and the edges or connections between the nodes may represent dependencies between the nodes, such as data dependencies, memory dependencies, or operational dependencies, among other examples. The compute graph can be organized, for example, in the layers, nodes, and connections between nodes of a neural network model.

The second stage 1036 (may also be referred to as the middle-end stage) can perform intermediate processing on the IR 1034 output from the first stage 1032. The intermediate processing may include performing various optimizations on the IR 1034. The optimizations may include target independent optimizations that are hardware agnostic, and/ or target specific optimizations that are tailored for the hardware architecture executing the program of input code 1042. Target independent optimizations may include algebraic simplification, graph minimization such as removal of unnecessary or redundant operations and/or dependencies, high-level dependency optimization by rearranging operators to improve compute latencies, etc.

Target specific optimizations include optimizations that take into account the capabilities of the hardware (e.g., acceleration engine 1012) that the input code is being compiled for. Such optimizations may include operators fusion to fuse multiple operators into an execution kernel supported by the hardware, data layout transformation to efficiently fit data into the hardware, etc. The target specific optimizations may take into account considerations such as whether the operations being performed in any one layer, or at any one node in a layer, may be too many for the acceleration engine 1012 to perform at the same time. The acceleration engine 1012 may, for example, have a limited amount of local storage space for the data needed for a computation, or the computations may be more than the acceleration engine 1012 can perform at one time. In such scenario, the operators of the layer or node can be broken down into smaller operations, which can fit into the acceleration engine's local memory and/or can fit into the computing capacity of the acceleration engine 1012. The output of the second stage 1036 can be an optimized IR 1038 such as code representing an optimized compute graph.

The third stage 1040 (may also be referred to as the back-end stage) can operate on the output 1038 of the second stage 1036, and perform various steps before producing the instructions (e.g., machine code) that are to be executed by the acceleration engine 1012. These steps can include instruction and data scheduling, register allocation, and/or code generation. Instruction and data scheduling determines the order in which instructions are executed and data are processed by the acceleration engine 1012, and may include low-level dependency optimization by rearranging operations to improve parallel execution, handling dependencies between nodes by inserting synchronization instructions into the code, etc. Register allocation may include identifying optimizations in register usage and/or memory bandwidth usage to avoid spilling, and reordering of register and/or memory accesses to hide access latencies given the memory capacity of the hardware, etc. Code generation converts the low-level optimized IR into machine code executable by the acceleration engine 1012, and includes mapping operations into hardware instructions according to the architecture of the acceleration engine 1012. The output of the third stage 1040 is compiled code 1044, which may include machine instructions in binary format. In some examples, the compiled code 1044 can be stored in the processor memory 1004. Alternatively or additionally, the compiled code 1044 can be copied to the storage device 1006 or to a network location. As noted above, the acceleration engine 1012 may be located at a different host system, in which case the compiled code 1044 can be sent over the network interface 1010 to the other host system.

In the example of FIG. 10, the host system 1000 can be executing a driver 1022, which can also be referred to as a device driver or runtime driver, that manages the acceleration engine 1012. The driver 1022 can provide an interface between applications executing on the host system 1000 (or on another host system) and the acceleration engine 1012. For example, the driver 1022 can provide an Application Program Interface (API) that defines functions for feeding input data to the acceleration engine 1012 and defining the operation to perform on the input data. In this and other examples, the driver 1022 can configure the acceleration engine 1012 to perform the operation. For example, the driver 1022 can identify a neural network model that the acceleration engine 1012 is to execute, as well as the location in the processor memory 1004 or on the storage device 1006 where the compiled code 1044 for the neural network model is located. The driver 1022 can further load into the acceleration engine 1012 or cause the acceleration engine 1012 to load the compiled code 1044, can load or cause the acceleration engine 1012 to load the input data on which the neural network model is to operate, and/or can cause the acceleration engine 1012 to begin executing on the input data. Once the acceleration engine 1012 has finished, the acceleration engine 1012 can notify the driver 1022, and the driver 1022 can deliver a result back to the application that requested the result.

Figure 11:
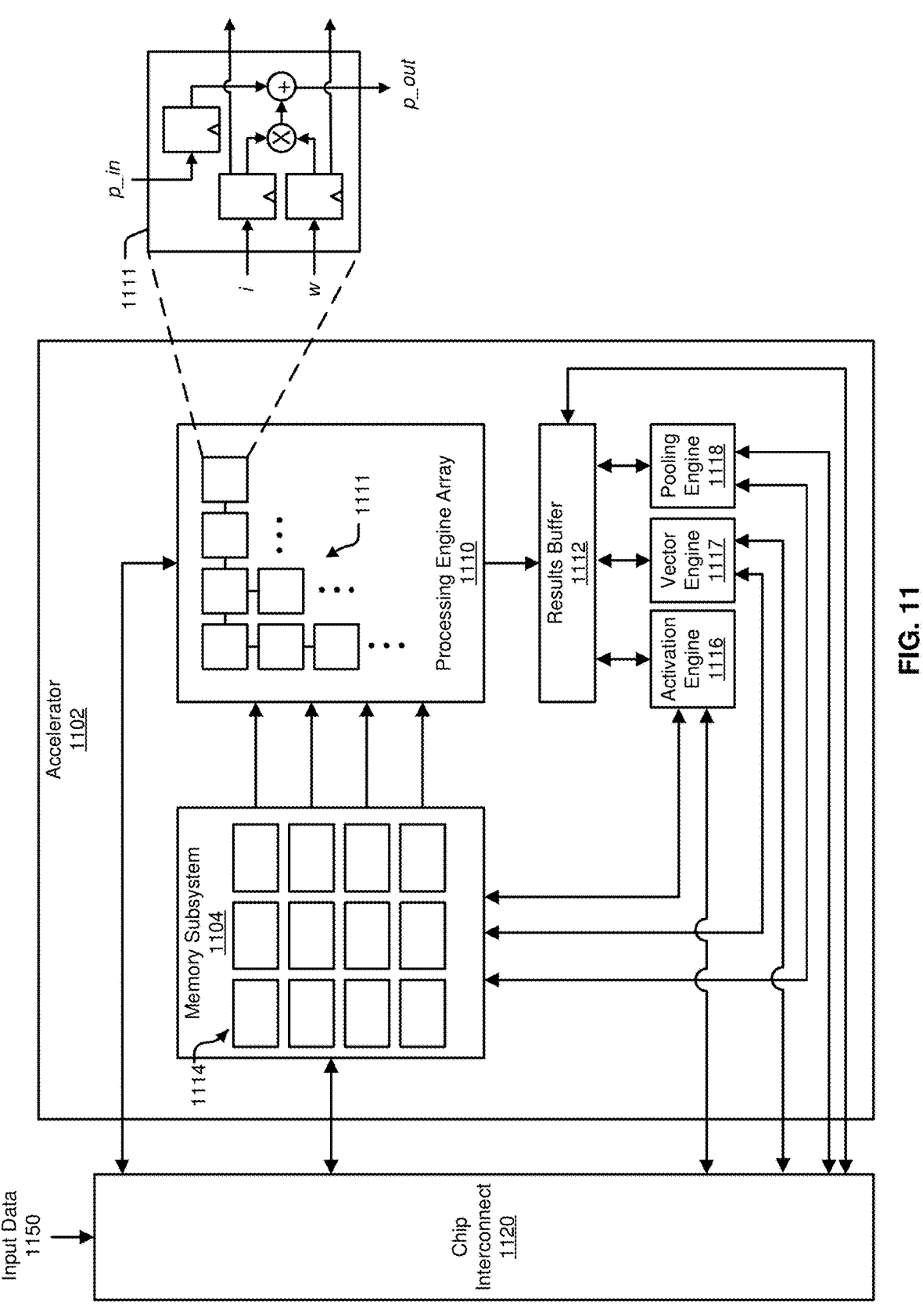
FIG. 11 illustrates a block diagram of an example of an integrated circuit device.

FIG. 11 is a block diagram illustrating an example of an integrated circuit device that can include an accelerator 1102. In various examples, the accelerator 1102, for a set of input data (e.g., input data 1150), can execute computations using a processing engine array 1110, an activation engine 1116, a vector engine 1117, and/or a pooling engine 1118. In some examples, the example accelerator 1102 may be an integrated circuit component of a processor, such as a neural network processor. The processor may have other integrated circuit components, including additional accelerator engines.

In various implementations, the memory subsystem 1104 can include multiple memory banks 1114. Memory subsystem 1104 can also be referred to as a state buffer. In these implementations, each memory bank 1114 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 1114. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 1104 can permit simultaneous access to the read or write channels of multiple memory banks. As another example, the memory subsystem 1104 can include arbitration logic such that arbitration between, for example, the outputs of multiple memory banks 1114 can result in more than one memory bank's output being used. In these and other examples, though globally managed by the memory subsystem 1104, each memory bank can be operated independently of any other.

Having the memory banks 1114 be independently accessible can increase the efficiency of the accelerator 1102. For example, values can be simultaneously read and provided to each row of the processing engine array 1110, so that the entire processing engine array 1110 can be in use in one clock cycle. As another example, the memory banks 1114 can be read at the same time that results computed by the processing engine array 1110 are written to the memory subsystem 1104. In contrast, a single memory may be able to service only one read or write at a time. With a single memory, multiple clock cycles can be required, for example, to read input data for each row of the processing engine array 1110 before the processing engine array 1110 can be started.

In various implementations, the memory subsystem 1104 can be configured to simultaneously service multiple clients, including the processing engine array 1110, the activation engine 1116, the vector engine 1117, the pooling engine 1118, and any external clients that access the memory subsystem 1104 over a communication fabric 1120. In some implementations, being able to service multiple clients can mean that the memory subsystem 1104 has at least as many memory banks as there are clients. In some cases, each row of the processing engine array 1110 can count as a separate client. In some cases, each column of the processing engine array 1110 can output a result, such that each column can count as a separate write client. In some cases, output from the processing engine array 1110 can be written into the memory banks 1114 that can then subsequently provide input data for the processing engine array 1110. As another example, the activation engine 1116, the vector engine 1117, and the pooling engine 1118 can include multiple execution channels, each of which can be separate memory clients. The memory banks 1114 can be implemented, for example, using static random access memory (SRAM).

In various implementations, the memory subsystem 1104 can include control logic. The control logic can, for example, keep track of the address spaces of each of the memory banks 1114, identify memory banks 1114 to read from or write to, and/or move data between the memory banks 1114. In some implementations, memory banks 1114 can be hardwired to particular clients. For example, a set of memory banks 1114 can be hardwired to provide values to the rows of the processing engine array 1110, with one memory bank servicing each row. As another example, a set of memory banks can be hard wired to receive values from columns of the processing engine array 1110, with one memory bank receiving data for each column.

The processing engine array 1110 is the computation matrix of the example accelerator 1102. The processing engine array 1110 can, for example, execute parallel integration, convolution, correlation, and/or matrix multiplication, among other things. The processing engine array 1110 includes multiple processing engines 1111, arranged in rows and columns, such that results output by one processing engine 1111 can be input directly into another processing engine 1111. Processing engines 1111 that are not on the outside edges of the processing engine array 1110 thus can receive data to operate on from other processing engines 1111, rather than from the memory subsystem 1104.

In various examples, the processing engine array 1110 uses systolic execution, in which data arrives at each processing engine 1111 from different directions at regular intervals. In some examples, input data can flow into the processing engine array 1110 from the left and weight values can be loaded at the top. In some examples weights and input data can flow from the left and partial sums can flow from top to bottom. In these and other examples, a multiply-and-accumulate operation moves through the processing engine array 1110 as a diagonal wave front, with data moving to the right and down across the array. Control signals can be input at the left at the same time as weights, and can flow across and down along with the computation.

In various implementations, the number of columns in the processing engine array 1110 determines the computational capacity of the processing engine array 1110, and the number of rows determines the required memory bandwidth for achieving maximum utilization of the processing engine array 1110. The processing engine array 1110 can have, for example, 64 columns and 128 rows, or some other number of columns and/or rows.

An example of a processing engine 1111 is illustrated in FIG. 11 in an inset diagram. As illustrated by this example, a processing engine 1111 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 1111.

In the illustrated example, an input from above can include a partial sum, p_in, provided either from another processing engine 1111 or from a previous round of computation by the processing engine array 1110. When starting a computation for a new set of input data, the top row of the processing engine array 1110 can receive a fixed value for p_in, such as zero. As illustrated by this example, i and w are multiplied together and the result is summed with p_in to produce a new partial sum, p_out, which can be input into another processing engine 1111. Various other implementations of the processing engine 1111 are possible.

Outputs from the last row in the processing engine array 1110 can be temporarily stored in the results buffer 1112. The results can be intermediate results, which can be written to the memory banks 1114 to be provided to the processing engine array 1110 for additional computation. Alternatively, the results can be final results, which, once written to the memory banks 1114 can be read from the memory subsystem 1104 over the communication fabric 1120, to be output by the system.

In some implementations, the accelerator 1102 includes an activation engine 1116. In these implementations, the activation engine 1116 can combine the results from the processing engine array 1110 into one or more output activations. For example, for a convolutional neural network, convolutions from multiple channels can be summed to produce an output activation for a single channel. In other examples, accumulating results from one or more columns in the processing engine array 1110 may be needed to produce an output activation for a single node in the neural network. In some examples, activation engine 1116 can be bypassed.

In various examples, the activation engine 1116 can include multiple separate execution channels. In these examples, the execution channels can correspond to the columns of the processing engine array 1110, and can perform an operation on the outputs of a column, the result of which can be stored in the memory subsystem 1104. In these examples, the activation engine 1116 may be able to perform between 1 and n parallel computations, where n is equal to the number of columns in the processing engine array 1110. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 1102 can include a pooling engine 1118. Pooling is the combining of outputs of the columns of the processing engine array 1110. Combining can include for example, computing a maximum value, a minimum value, an average value, a median value, a summation, a multiplication, or another logical or mathematical combination. In various examples, the pooling engine 1118 can include multiple execution channels that can operating on values from corresponding columns of the processing engine array 1110. In these examples, the pooling engine 1118 may be able to perform between 1 and n parallel computations, where n is equal to the number of columns in the processing engine array 1110. In various examples, execution channels of the pooling engine 1118 can operate in parallel and/or simultaneously. In some examples, the pooling engine 1118 can be bypassed.

In some implementations, the accelerator 1102 can further include a vector engine 1117 (may also be referred to as a vector compute engine or deep vector engine). Vector engine 1117 can be implemented using, for example, components of execution engine 600 and/or vector compute engine 517, and may include multiple compute channels implemented using integrated circuit 400. Vector engine 1117 is a compute engine that can perform computations and manipulations on values stored in memory subsystem 1104 and/or results buffer 1112 such as values representing matrices of input values, weight values, intermediate results, etc. Vector engine 1117 can include multiple execution channels each with a pipeline of computation circuit blocks (e.g., arithmetic logic units) to perform complex computations such as nested multiply-and-add operations and/or complex manipulations such as sorting operations. In various examples, execution channels of the vector engine 1117 can operate in parallel and/or simultaneously. In some examples, the vector engine 1117 can be bypassed or be omitted.

Herein, the activation engine 1116, the vector engine 1117, and the pooling engine 1118 may be referred to collectively as execution engines. The processing engine array 1110 is another example of an execution engine. Another example of an execution engine is a Direct Memory Access (DMA) engine, which may be located outside the accelerator 1102.

Input data 1150 can arrive over the communication fabric 1120. The communication fabric 1120 can connect the accelerator 1102 to other components of a processor, such as a DMA engine that can obtain input data 1150 from an Input/Output (I/O) device, a storage drive, or a network interface. The input data 1150 can be, for example one-dimensional data, such as a character string or numerical sequence, or two-dimensional data, such as an array of pixel values for an image or frequency and amplitude values over time for an audio signal. In some examples, the input data 1150 can be three-dimensional, as may be the case with, for example, the situational information used by a self-driving car or virtual reality data. In some implementations, the memory subsystem 1104 can include a separate buffer for the input data 1150. In some implementations, the input data 1150 can be stored in the memory banks 1114 when the accelerator 1102 receives the input data 1150.

In some examples, the accelerator 1102 can implement a neural network processing engine. In these examples, the accelerator 1102, for a set of input data 1150, can execute a neural network to perform a task for which the neural network was trained. Executing a neural network on a set of input data can be referred to as inference or performing inference.

The weights for the neural network can be stored in the memory subsystem 1104, along with input data 1150 on which the neural network will operate. The neural network can also include instructions, which can program the processing engine array 1110 to perform various computations on the weights and the input data. The instructions can also be stored in the memory subsystem 1104, in the memory banks 1114 or in a separate instruction buffer. The processing engine array 1110 can output intermediate results, which represent the outputs of individual layers of the neural network. In some cases, the activation engine 1116, the vector engine 1117, and/or pooling engine 1118 may be enabled for computations called for by certain layers of the neural network. The accelerator 1102 can store the intermediate results in the memory subsystem 1104 for inputting into the processing engine array 1110 to compute results for the next layer of the neural network. The processing engine array 1110 can further output final results from a last layer of the neural network. The final results can be stored in the memory subsystem 1104 and then be copied out to host processor memory or to another location.

Figure 12:
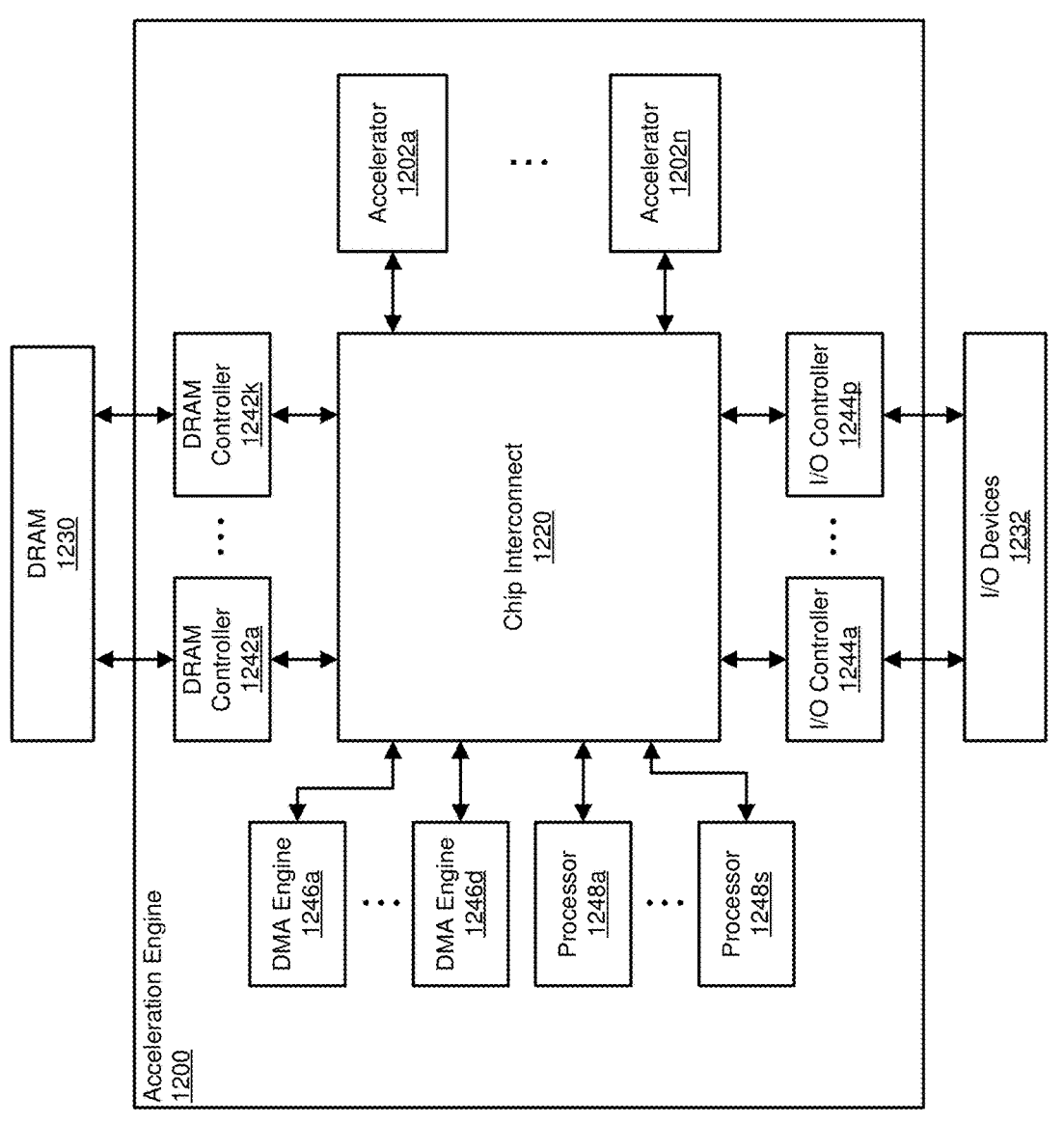
FIG. 12 illustrates a block diagram of an example of an acceleration engine.

FIG. 12 includes a block diagram that illustrates an example of an acceleration engine 1200. The acceleration engine 1200 is an example of an integrated circuit that can include one or more accelerators 1202*a*-1202*n* that may be similar to the accelerator illustrated in FIG. 11.

In the example of FIG. 12, the acceleration engine 1200 includes multiple accelerators 1202*a*-1202*n*, each of which can perform a set of operations. In various examples, the accelerators 1202*a*-1202*n* are for particular types of operations, so that the accelerators 1202*a*-1202*n* can perform the operations much faster than when similar operations are performed by a general-purpose processor. In various examples, to perform a set of operations, input data on which the operations are to be performed must first be moved into the accelerators 1202*a*-1202*n*. Additionally, in some cases, program code is also moved into the accelerators 1202*a*-1202*n*, which programs the operations that the accelerators 1202*a*-1202*n* will perform on the data. In the illustrated example, the acceleration engine 1200 includes n accelerators 1202*a*-1202*n*. Examples of accelerators that can be included in the acceleration engine 1200 include graphics accelerators, floating point accelerators, neural network accelerators, and others. In various examples, the accelerators 1202*a*-1202*n* can each be the same (e.g., each of the is a graphics accelerator) or can be different (e.g., the accelerators 1202*a*-1202*n* include a graphics accelerator, a floating point accelerator, and neural network accelerator).

The example acceleration engine 1200 further includes DRAM controllers 1242*a*-1242*k* for communicating with an external memory. The external memory is implemented, in this example, using DRAM 1230. In the illustrated example, the acceleration engine 1200 includes k DRAM controllers 1242*a*-1242*k*, each of which may be able to communicate with an independent set of banks of DRAM. In other examples, other types of RAM technology can be used for the external memory. The DRAM controllers 1242*a*-1242*k* can also be referred to as memory controllers.

In various examples, input data and/or program code for the accelerators 1202*a*-1202*n* can be stored in the DRAM 1230. Different programs can cause the accelerators 1202*a*-1202*n* to perform different operations. For example, when one of the accelerators is a neural network accelerator, one program can configure the neural network accelerator to perform speech recognition while another program can configure the neural network accelerator to perform image recognition. In various examples, different accelerators 1202*a*-1202*n* can be programmed with different programs, so that each performs a different set of operations. In various examples, the processors 1248*a*-1248*s* can manage moving of program code from the DRAM 1230 to the accelerators 1202*a*-1202*n*.

The example acceleration engine 1200 further includes I/O controllers 1244*a*-1244*p* for communicating with I/O devices 1232 in the system. The acceleration engine 1200 can communicate with I/O devices over, for example, a processor bus. In some examples, the processor bus can be implemented using Peripheral Component Interconnect (PCI) and/or a variation of the PCI bus protocol. The processor bus can connect the acceleration engine 1200 to I/O devices such as, for example, input and output devices, memory controllers, storage devices, and/or network interface cards, among other things. In some examples, the I/O controllers 1244-1244*p* can enable the acceleration engine 1200 to act as an I/O device for a host processor. For example, the acceleration engine 1200 can be the recipient of input data from the host processor, and a command indicating an operation to be performed on the input data (e.g., a particular computation or analysis). In the illustrated example, the acceleration engine 1200 includes p I/O controllers 1244*a*-1244*p*, each of which may include a separate root complex and may communicate with a separate set of I/O devices 1232. In other examples, other standardized bus protocols, such as Ultra Path Interconnect (UPI) can be used for the host bus. In other examples, a proprietary bus protocol can be used.

Movement of data in the acceleration engine 1200 can be managed by one or more processors 1248*a*-1248*s*, which can also be referred to as data management processors. In the example of FIG. 12, the acceleration engine 1200 includes s processors 1248*a*-1248*s* incorporated into the device (e.g., on the same silicon die). In other examples, the processors 1248*a*-1248*s* can be external to the acceleration engine 1200 (e.g., on a different die and/or in a different package). In some examples, the processors 1248*a*-1248*s* can manage the movement of data from I/O devices 1232 to the accelerators 1202*a*-1202*n* or the DRAM 1230. For example, input data may be located at an I/O device 1232 or in processor memory, and the processors 1248*a*-1248*s* can move the input from the I/O device 1232 or processor memory into an accelerator or into DRAM 1230. As another example, program code for the accelerators 1202*a*-1202*n* may be located on an I/O device 1232 or in processor memory.

The example acceleration engine 1200 further includes DMA engines 1246*a*-1246*d* that can move data between the accelerators 1202*a*-1202*n*, DRAM controllers 1242*a*-1242*k*, and I/O controllers 1244*a*-1244*p*. In the illustrated example, the acceleration engine 1200 includes d DMA engines 1246*a*-1246*d*. In some implementations, the DMA engines 1246*a*-1246*d* can be assigned to specific tasks, such as moving data from the DRAM controllers 1242*a*-1242*d* to the accelerators 1202*a*-1202*n*, or moving data between the I/O controllers 1244*a*-1244*p* and the accelerators 1202*a*-1202*n*. These tasks can be assigned, for example, by enqueueing descriptors with the DMA engines 1246*a*-1246*d*, where a descriptor identifies an address for a block of data and an operation (e.g., a read or a write) to perform. A descriptor, for example, can direct a DMA engine to instruct a DMA controller to read a block of data from DRAM 1230. A descriptor can, as a further example, instruct the DMA engine to write data, read by the DMA controller, to an accelerator. Further descriptors can be used to move data from an accelerator to DRAM 1230.

In various examples, each of the processors 1248*a*-1248*s* can be responsible for managing the data movement for a different accelerator. In some examples, a processor may manage the data movement for more than one accelerator. Similarly, in various examples, each of the processors 1248*a*-1248*s* can be assigned to one or more DMA engines 1246*a*-1246*d*. In these and other examples, associations between processors 1248*a*-1248*s*, accelerators 1202*a*-1202*n*, and DMA engines 1246*a*-1246*d* are determined by program code being executed by each respective processor.

In the example acceleration engine 1200, the various components can communicate over a chip interconnect 1220. The chip interconnect 1220 primarily includes wiring for routing data between the components of the acceleration engine 1200. In some cases, the chip interconnect 1220 can include a minimal amount of logic, such as multiplexors to control the direction of data, flip-flops for handling clock domain crossings, and timing logic.

Figure 13:
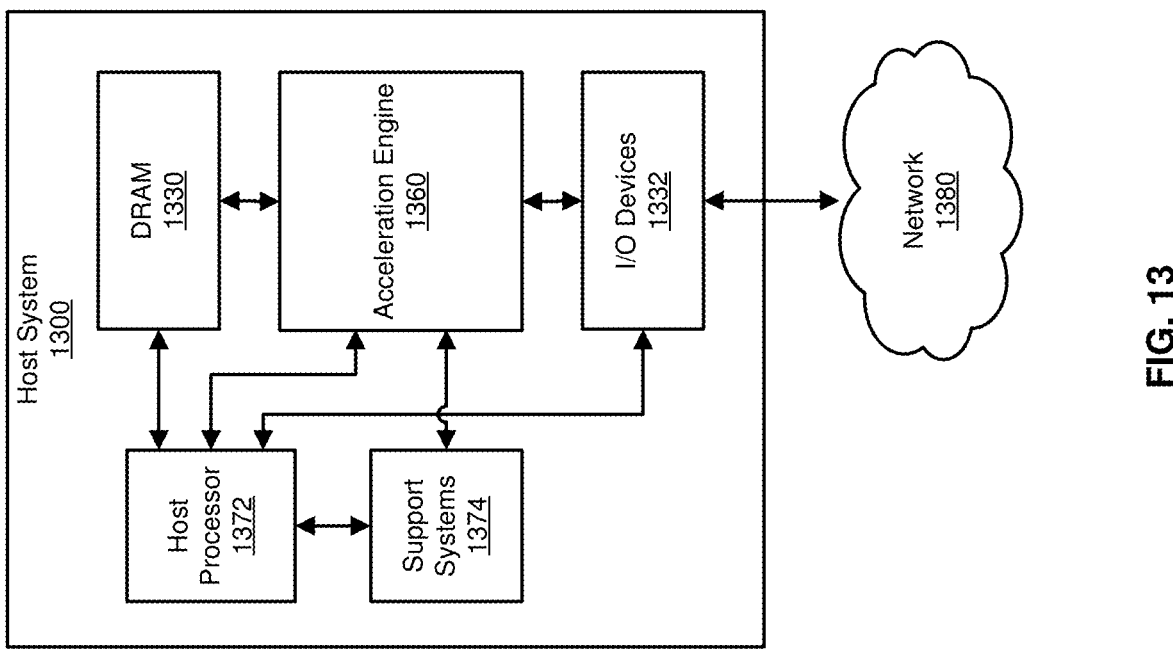
FIG. 13 illustrates a block diagram of an example of a host system.

FIG. 13 includes a block diagram that illustrates an example of a host system 1300 in which an acceleration engine 1360 can be used. The acceleration engine 1360 of FIG. 13 is an example of a device that can include one or more accelerators such as is illustrated in FIG. 12. The example host system 1300 of FIG. 13 includes the acceleration engine 1360, a host processor 1372, DRAM 1330 or processor memory, I/O devices 1332, and support systems 1374. In various implementations, the host system 1300 can include other hardware that is not illustrated here.

The host processor 1372 is a general-purpose integrated circuit that is capable of executing program instructions. In some examples, the host processor 1372 can include multiple processing cores. A multi-core processor may include multiple processing units within the same processor. In some examples, the host system 1300 can include more than one host processor 1372. In some examples, the host processor 1372 and the acceleration engine 1360 can be one chip, such as, one or more integrated circuits within the same package.

In various examples, the host processor 1372 can communicate with other components in the host system 1300 over one or more communication channels. For example, the host system 1300 can include a host processor bus, which the host processor 1372 can use to communicate with the DRAM 1330, for example. As another example, the host system 1300 can include an I/O bus, such as a PCI-based bus, over which the host processor 1372 can communicate with the acceleration engine 1360 and/or the I/O devices 1332, for example. In various examples, the host system 1300 can, alternatively or additionally, include other communication channels or busses, such as serial busses, power management busses, storage device busses, and so on.

In some examples, software programs executing on the host processor 1372 can receive or generate input for processing by the acceleration engine 1360. In some examples, the programs can select an appropriate neural network to execute for a given input. For example, a program may be for language translation, and can select one or more neural networks capable of speech recognition and/or machine translation. In these and other examples, the programs can configure the acceleration engine 1360 with the neural network to execute, and/or can select a neural network processing engine on the acceleration engine 1360 that has previously been configured to execute the desired neural network. In some examples, once the acceleration engine 1360 has started an inference on input data, the host processor 1372 can manage the movement of data (such as weights, instructions, intermediate results, results of conditional layers, and/or final results) into or out of the acceleration engine 1360.

In some examples, a software program that is using the acceleration engine 1360 to conduct an inference can read the result from a conditional layer from the acceleration engine 1360 and/or from a storage location, such as in DRAM 1330. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 1330 is memory that is used by the host processor 1372 for storage of program code that the host processor 1372 is in the process of executing, as well as values that are being operated on. In some examples, the data for a neural network (e.g., weight values, instructions, and other data) can be all or partially stored in the DRAM 1330. DRAM is a common term for processor memory, and though DRAM is volatile memory, processor memory can be volatile and/or non-volatile. Though not illustrated here, the host system 1300 can include other volatile and non-volatile memories for other purposes. For example, the host system 1300 can include a Read-Only Memory (ROM) that stores boot code for booting the host system 1300 at power on, and/or Basic Input/Output System (BIOS) code.

Though not illustrated here, the DRAM 1330 can store instructions for various programs, which can be loaded into and be executed by the host processor 1372. For example, the DRAM 1330 can be storing instructions for an operating system, one or more data stores, one or more application programs, one or more drivers, and/or services for implementing the features disclosed herein.

The operating system can manage and orchestrate the overall operation of the host system 1300, such as scheduling tasks, executing applications, and/or controller peripheral devices, among other operations. In some examples, a host system 1300 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 1300. For example, some drivers can provide communication between the operating system and peripheral devices or I/O devices 1332. Alternatively or additionally, some drivers may provide communication between application programs and the operating system, and/or application programs and peripheral devices accessible to the host system 1300. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 1332 can include hardware for connecting to user input and output devices, such as keyboards, mice, pens, tablets, voice input devices, touch input devices, displays or monitors, speakers, and printers, among other devices. The I/O devices 1332 can also include storage drives and/or network interfaces for connecting to a network 1380. For example, the host system 1300 can use a network interface to communicate with storage devices, user terminals, other computing devices or servers, and/or other networks, among various examples.

In various examples, one or more of the I/O devices 1332 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 1300 or may be in an external enclosure. A storage device can be fixed (e.g., attached by screws) or removable (e.g., having a physical release mechanism and possibly a hot-plug mechanism).

Storage devices, the DRAM 1330, and any other memory component in the host system 1300 are examples of computer-readable storage media. Computer-readable storage media are physical mediums that are capable of storing data in a format that can be read by a device such as the host processor 1372. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 1332 can be PCI-based devices. In these examples, a PCI-based I/O device includes a PCI interface for communicating with the host system 1300. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 1374 can include hardware for coordinating the operations of the acceleration engine 1360. For example, the support systems 1374 can include a microprocessor that coordinates the activities of the acceleration engine 1360, including moving data around on the acceleration engine 1360. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 1372. In some examples, the program executed by the microprocessor is stored on the hardware of microprocessor, or on a non-volatile memory chip in the host system 1300. In some examples, the microprocessor and the acceleration engine 1360 can be on chip, such as one integrated circuit on the same die and in the same package.

In some examples, the support systems 1374 can be responsible for taking instructions from the host processor 1372 when programs executing on the host processor 1372 request the execution of a neural network. For example, the host processor 1372 can provide the support systems 1374 with a set of input data and a task that is to be performed on the set of input data. In this example, the support systems 1374 can identify a neural network that can perform the task, and can program the acceleration engine 1360 to execute the neural network on the set of input data. In some examples, the support systems 1374 only needs to select an appropriate neural network processing engine of the neural network processor. In some examples, the support systems 1374 may need to load the data for the neural network onto the acceleration engine 1360 before the acceleration engine 1360 can start executing the neural network. In these and other examples, the support systems 1374 can further receive the output of executing the neural network, and provide the output back to the host processor 1372.

In some examples, the operations of the support systems 1374 can be handled by the host processor 1372. In these examples, the support systems 1374 may not be needed and can be omitted from the host system 1300.

In various examples, the host system 1300 can include a combination of host systems, processor nodes, storage subsystems, and I/O chassis that represent user devices, service provider computers or third-party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 1300 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer-implemented method comprising:
receiving an input tensor representing training data to train a neural network;
performing a normalization operation on the input tensor, the normalization operation including:
streaming data elements of a vector of the input tensor from a memory into a vector compute channel having a pipeline formed by coupling a set of compute stages in series;
computing a first running mean and a first running variance associated with data elements of the vector having odd sequence indices, and a second running mean and a second running variance associated with data elements of the vector having even sequence indices from a single pass of streaming the data elements into the vector compute channel;
aggregating the first running mean and the second running mean to compute a mean associated with the data elements of the vector, and aggregating the first running variance and the second running variance to compute a variance associated with the data elements of the vector; and
modifying the input tensor to generate a normalized input tensor based on the computed mean and the computed variance;
writing the normalized input tensor back to the memory; and
training the neural network using the normalized input tensor.

2. The computer-implemented method of claim 1, wherein the vector compute channel includes eight compute stages coupled in series in a pipeline.

3. The computer-implemented method of claim 2, wherein for each of the data elements streamed into the vector compute channel:
performing, at a first compute stage of the vector compute channel, multiplication of the data element with a reciprocal of a sequence index of the data element;
performing, at a second compute stage of the vector compute channel, subtraction of the reciprocal of the sequence index of the data element from a floating-point value of one;
performing, at a third compute stage of the vector compute channel, multiplication of an output of the second compute stage with a previous mean value computed for a previous data element of the vector;
performing, at a fourth compute stage of the vector compute channel, addition of an output of the third compute stage to an output of the second compute stage to compute a mean value for the data element;
performing, at a fifth compute stage of the vector compute channel, subtraction of the mean value from the data element;
performing, at a sixth compute stage of the vector compute channel, subtraction of the previous mean value from the data element;
performing, at a seventh compute stage of the vector compute channel, multiplication of an output of the fifth compute stage with an output of the sixth compute stage; and performing, at an eighth compute stage of the vector compute channel, addition of a previous variance value computed for the previous data element to an output of the seventh compute stage to compute a variance value for the data element.

4. The computer-implemented method of claim 1, wherein the normalization operation includes streaming reciprocals of sequence indices from a parameters table into the vector compute channel in parallel with the data elements of the vector.

5. A computer-implemented method comprising:
serially inputting data elements of a vector into a compute channel;
generating, in the compute channel, a first running mean and a first running variance associated with data elements of the vector having odd sequence indices, and a second running mean and a second running variance associated with data elements of the vector having even sequence indices; and
subsequent to serially inputting data elements into the compute channel:
aggregating the first running mean and the second running mean to generate a mean associated with the data elements of the vector; and
aggregating the first running variance and the second running variance to generate a variance associated with the data elements of the vector.

6. The computer-implemented method of claim 5, further comprising serially inputting reciprocals of sequence indices into the compute channel in parallel with the data elements of the vector.

7. The computer-implemented method of claim 6, wherein the reciprocals of sequence indices are inputted from a parameter table that is preloaded with the reciprocals.

8. The computer-implemented method of claim 5, wherein the compute channel includes a compute stage that toggles between updating the first running mean and updating the second running mean at each clock cycle.

9. The computer-implemented method of claim 8, wherein the compute stage includes:
a first feedback register to store the first running mean; and
a second feedback register to store the second running mean.

10. The computer-implemented method of claim 5, wherein the compute channel includes a compute stage that toggles between updating the first running variance and updating the second running variance at each clock cycle.

11. The computer-implemented method of claim 10, wherein the compute stage includes:
a first feedback register to store the first running variance; and
a second feedback register to store the second running variance.

12. The computer-implemented method of claim 5, further comprising outputting a first count of a number of the data elements of the vector having odd sequence indices, and outputting a second count of a number of the data elements of the vector having even sequence indices.

13. An integrated circuit device comprising:
a plurality of compute stages coupled in series to form a compute channel,
wherein the compute channel is operable to:
serially receive data elements of a vector; and
generate a first running variance for data elements of the vector having odd sequence indices, and a second running variance for data elements of the vector having even sequence indices from a single pass of the data elements through the compute channel.

14. The integrated circuit device of claim 13, wherein one of the compute stages of the compute channel includes a first feedback register to store the first running variance, and a second feedback register to store the second running variance.

15. The integrated circuit device of claim 13, wherein the compute channel is operable to generate a first running mean for data elements of the vector having odd sequence indices, and a second running mean for the data elements of the vector having even sequence indices.

16. The integrated circuit device of claim 15, wherein one of the compute stages of the compute channel includes a first feedback register to store the first running mean; and a second feedback register to store the second running mean.

17. The integrated circuit device of claim 13, wherein the compute channel is operable to serially receive reciprocals of sequence indices in parallel with the data elements.

18. The integrated circuit device of claim 17, further comprising a parameter table that is preloaded with the reciprocals of sequence indices.

19. The integrated circuit device of claim 13, wherein compute channel includes eight compute stages.

20. A non-transitory computer readable medium having stored therein instructions that, when executed by one or more processors, cause the one or more processors to execute a compiler, the compiler performing operations comprising:

receiving a description of a neural network model;

determining that the neural network model includes a tensor normalization operation;

generating a batch statistics machine instruction to compute a first mean and a first variance associated with data elements of the tensor having odd sequence indices, and a second mean and a second variance associated with the data elements of the tensor having even sequence indices;

generating an aggregate machine instruction to compute a mean of the data elements by aggregating the first mean and the second mean, and a variance of the data elements by aggregating the first variance and the second variance; and generating a tensor scale machine instruction to normalize the tensor based on the computed mean and the computed variance.

* * * * *